United States Patent [19]

Ishida et al.

[11] Patent Number: 5,485,560
[45] Date of Patent: Jan. 16, 1996

[54] DISPLAYING METHOD AND SYSTEM FOR DISPLAYING AN OBJECT BY DESIGNATING A STATE OF DISPLAY OF THE OBJECT

[75] Inventors: Tomotoshi Ishida; Shunsuke Minami; Yasumasa Kawashima; Hiroshi Arai, all of Ibaraki; Takeo Yamada, Tokyo; Shigeru Arai, Kanagawa, all of Japan

[73] Assignee: Hitachi, Ltd., Tokyo, Japan

[21] Appl. No.: 948,257

[22] Filed: Sep. 21, 1992

[30] Foreign Application Priority Data

Sep. 20, 1991 [JP] Japan .................. 3-241961

[51] Int. Cl.⁶ .................................................. G06T 17/00
[52] U.S. Cl. .................. 395/133; 395/119; 395/155; 395/161
[58] Field of Search .................. 395/133, 138, 395/139, 140, 141, 152, 155–158, 161, 119, 120

[56] References Cited

U.S. PATENT DOCUMENTS 4,962,472 10/1990 Seki et al. .................. 395/161
5,019,961 5/1991 Addesso et al. .................. 395/161
5,138,697 8/1992 Yamamoto et al. .................. 395/120
5,165,015 11/1992 Coggins .................. 395/161

FOREIGN PATENT DOCUMENTS 61-243568 10/1986 Japan .

Primary Examiner—Almis R. Jankus
Attorney, Agent, or Firm—Antonelli, Terry, Stout & Kraus

[57] ABSTRACT

A drawing information processing method and system adapted to offer a plurality of types of standard display results for each object to-be-displayed through instructions. Data for specifying the form of the object to-be-displayed, and display method data for stipulating a display method showing how the object to-be-displayed is displayed, are stored so as to correspond to each other. The display method data includes data for designating, for example, a display direction, display range, and display position or the like. A plurality of sets of display method data are stored. For displaying, one data which represents a desired status may be selected from a plurality of displaying method data to display the object to-be-displayed in the selected form based on the selected data.

25 Claims, 35 Drawing Sheets

F I G. 25

PART DATA : "PARTS LIST"

| PART id | PART NAME | POINT DATA NAME | LINE DATA NAME | SURFACE DATA NAME | DIMENSION DATA NAME | ... |
|---------|-----------|-----------------|----------------|-------------------|---------------------|-----|
| 1 | BODY | "POINT 1" | "LINE 1" | "SURFACE 1" | "DIMENSION 1" | ... |
| 2 | KNOB | "POINT 2" | "LINE 2" | "SURFACE 2" | "DIMENSION 2" | ... |
| 3 | GENERAL | "POINT 3" | "LINE 3" | "SURFACE 3" | "DIMENSION 3" | ... |
| . | . | . | . | . | . | . |

FIG. 26

| PARENTAL RELATION DATA : "PARENT-CHILD LIST" |||
|---|---|---|
| PARENT PART id | CHILD PART id | ... |
| 3 | 1 | ... |
| 3 | 2 | ... |
| . | . | ... |
|  |  |  |

FIG. 27

POINT DATA NAME : "POINT 3"

POINT DATA NAME : "POINT 2"

| POINT DATA NAME : "POINT 1" |||||
|---|---|---|---|---|
| POINT id | x COORDINATE | y COORDINATE | z COORDINATE | ... |
| 1 | 0 | 0 | 0 | ... |
| 2 | 1 0 0 | 0 | 0 | ... |
| 3 | 0 | 1 0 0 | 0 | ... |
| . | . | . | . | ... |
|  |  |  |  |  |

F I G. 2 8

| DRAWING DATA : "DRAWING LIST" | | | | |
|---|---|---|---|---|
| DRAWING id | DRAWING NAME | PART id | DRAWING DATA NAME | · · · |
| 1 | OPERATION DRAWING | 1 | "DRAWING 1" | · · · |
| 2 | PART DRAWING | 1 | "DRAWING 2" | · · · |
| 3 | OPERATION DRAWING | 2 | "DRAWING 3" | · · · |
| 4 | OPERATION DRAWING | 3 | "DRAWING 4" | · · · |
| 5 | ASSEMBLY DRAWING | 3 | "DRAWING 5" | · · · |
| · | · | · | · | · · · |

FIG. 43

RESTORING DETAILED DRAWING DATA

861
ORIGINATE VIEWS IN ACCORDANCE WITH VIEW DATA CONTAINED IN DRAWING DATA.

862
SPECIFY DIMENSIONS TO-BE-DISPLAYED WITH REFERENCE TO DISPLAY DIMENSION DATA VIA DRAWING DATA.

RETURN

DESIGN ENGINEER          PRODUCTION ENGINEER

DESIGN ENGINEER          PRODUCTION ENGINEER

DISPLAYING METHOD AND SYSTEM FOR DISPLAYING AN OBJECT BY DESIGNATING A STATE OF DISPLAY OF THE OBJECT

BACKGROUND OF THE INVENTION

The present invention relates to a system which deals with graphic information and which is utilized for computer-aided design (CAD), etc. More particularly, it relates to a drawing information processing method and system which are applicable to the design and production of a product and also to the transfer of design information to a production engineer.

In the design of a machine or the like, the model of graphic information is utilized for expressing the object to-be-designed. In the past, an object as shown in FIG. 2 by way of example was usually dealt with in terms of a two dimensional drawing as shown in FIG. 3. Recently, such objects are designed using computer systems. In such a system, the object is expressed, not only as a two-dimensional graphic, but also as a three-dimensional graphic. Moreover, the expression of the object to-be-designed is not restricted to the form thereof, but sometimes contains graphic items other than the form, such as dimensions (namely, lengths) and a reference line, or information items given by a numerical value and characters, such as weight, material and fabricating method.

In the areas of design and production, design information, etc., are transferred by a method as stated below.

The method is as illustrated in FIG. 15, and uses a database which is accessible by both an engineer in charge of design and an engineer in charge of production. With this method, the design engineer saves the data of an object to-be-designed in the database, and the production engineer refers to the saved data. If necessary, the production engineer can also alter the data. According to this method, the design engineer and the production engineer need not possess the data separately. In addition, data on a display method can be dealt with as belonging to the data object to-be-designed, and the information itself, which is delivered from the design engineer to the production engineer, is verified by the design engineer.

Two or more CAD systems connected by communication modules, for example, are used in the transfer of the design information as stated above. In the CAD systems, the data of the object to-be-designed and the data of the display method held in correspondence therewith are dealt with.

In general, design information is transferred from a design department to a production department. Information which is delivered from a design engineer to a production engineer is not of only one type for one product. The information contains, at least, information for fabricating parts and information for assembling the parts. Besides, appropriate display methods are existent for the respective information items. In other words, the method of display to be referred to is not the same for all the parts which constitute the object or product. Regarding the object shown in FIG. 2 by way of example, the information of an assembled state displayed in directions and configurations as shown in FIG. 3 is appropriate for assembling the object, and information items for displaying individual parts are appropriate for machining the parts. Moreover, since the constituent parts are of one set in themselves, the data items of the parts shown in individual drawings must be one set of data in order to keep the data consistent.

In this regard, with the prior-art method, even when the observer requires information items displayed in a plurality of aspects, only the data of one type of display method can be saved for the data of one object. By way of example, in a case where the data of the display method corresponding to FIG. 3 is saved in association with the data of the object, the data items of display methods corresponding to part drawings cannot be saved in association with the data of the object. On the other hand, in a case where the data of a display method corresponding to the part drawing of a specified part is saved, the data items of display methods corresponding to the drawing of the whole object and the part drawing of another part cannot be saved. Accordingly, even when the production engineer requires a plurality of types of information, for example, the information items corresponding to the part drawings and the information corresponding to the assembly drawing, only the data of one type of display method can be dealt with for the data of one object to-be-designed. Consequently, only the data of one type of display method can be delivered from the design engineer to the production engineer.

Therefore, when someone, for example the production engineer, wants to refer to a display method for which no display method data exists, the display method must be designated individually. Such an expedient becomes as illustrated in FIG. 4 in terms of a model. As seen from the figure, the display method is designated twice. This leads to the problem that the expedient expends labor and necessitates wasteful operations.

Another expedient is sometimes employed wherein the data of the object is copied and wherein the data items of different display methods are saved as belonging to the respective object data items. This expedient becomes as illustrated in FIG. 4 in terms of a model. Herein, a plurality of object data items are existent, which incurs the problems of increase in the quantity of data and complicacy in the management of the data. A technique for the management is, for example, an expedient proposed in Japanese Patent Application Laid-open No. 243568/1986. This technique, however, has the problem that the alterations of the data, etc., cannot be flexibly coped with. More specifically, in the case of altering the data, all the data items need to be altered, resulting in the problem that the alterations are laborious. Besides, some of the plurality of data items might fail to be altered, resulting in the disadvantage that it is difficult to keep the data items consistent on account the different versions which exist.

SUMMARY OF THE INVENTION

An object of the present invention is to solve the problems as stated above, and to provide a drawing information processing method and system in which a plurality of types of standard display results are obtained for each object to-be-displayed through the use of simple instructions.

Another object of the present invention is to provide a drawing information processing method and system in which a production engineer is permitted to easily refer to design information delivered from a design engineer, making it possible to promptly design and produce a product.

The above objects are accomplished by saving a plurality of sets of display method data in correspondence with one set of object data. To this end, according to one aspect of performance of the present invention, there is provided a drawing information processing method wherein drawing information of an object to-be-displayed is saved, and wherein the object to-be-displayed is displayed on a display screen on the basis of the drawing information, The method comprises the steps of: saving a plurality of sets of display method data for stipulating aspects of displays of the object to-be-displayed, in correspondence with one set of object data and in relation with the display object data; accepting selection of at least one of the display methods indicated by the plurality of sets of display method data saved, in the case of presenting the display of the object to-be-displayed; and displaying the object to-be-displayed in accordance with the designated display method.

According to another aspect of performance of the present invention, there is provided a drawing information processing system, comprising a saving device for saving drawing information of an object to-be-displayed, display device for displaying the object to-be-displayed on a display screen on the basis of the drawing information, and an input device for accepting an external instruction and inputting designation of a display method; the saving device having as the drawing information of the object to-be-displayed, display object data which specifies forms of the object to-be-displayed, and display method data which stipulates aspects of displays of the object to-be-displayed and as which a plurality of sets of data for stipulating the different display aspects are saved in relation with the display object data of each set; the input device accepting selection of at least one of a plurality of sets of display method data; the display device displaying the object to-be-displayed in accordance with the designated display method.

As an example of application, the present invention can construct a computer-aided design/production plant out of systems each of which can save a plurality of sets of display method data in correspondence with one set of object data, and device for exchanging data between or among the systems.

In operation, the plurality of sets of data of display methods used in the generation of a model are saved in correspondence with the data of an object. When an instruction for reference is given, the saved data of the display method is referred to, and the display of the object is presented in accordance with the corresponding display method.

A plurality of sets of display method data for stipulating the display aspects of an object to-be-displayed are saved in correspondence with one set of display object data and in relation with the display object data, whereby drawings can be displayed in the different aspects from identical object to-be-displayed. By way of example, a designer can save drawings of different types, such as an assembly drawing and a part drawing; drawings of different displaying viewpoints, such as a perspective view and a plan view; drawings bearing dimensions (namely, lengths); etc. in terms of data beforehand.

In displaying the object to-be-displayed, the selection of at least one of the plurality of sets of display methods saved is accepted, whereby the saved drawings in the plurality of types of aspect can be selectively displayed. Thus, a production engineer, for example, can select at least one drawing convenient for his/her use from among the various drawings prepared by the designer, so as to display the selected drawing.

Accordingly, a plurality of types of standard display results can be obtained for one object through simple instructions. Besides, the production engineer can easily refer to the design information delivered from the design engineer. Moreover, in this way, a time period for preparing appropriate drawings required for production is shortened, thereby making it possible to promptly design and produce the object as a product.

BRIEF DESCRIPTION OF THE DRAWINGS

FIGS. 25 thru 30 are diagrams showing data organizations in the present invention, respectively;

FIGS. 31 thru 43 are diagrams showing various algorithms in the present invention;

DETAILED DESCRIPTION OF THE PREFERRED EMBODIMENTS

Now, embodiments of the present invention will be described with reference to the accompanying drawings.

Figure 5:
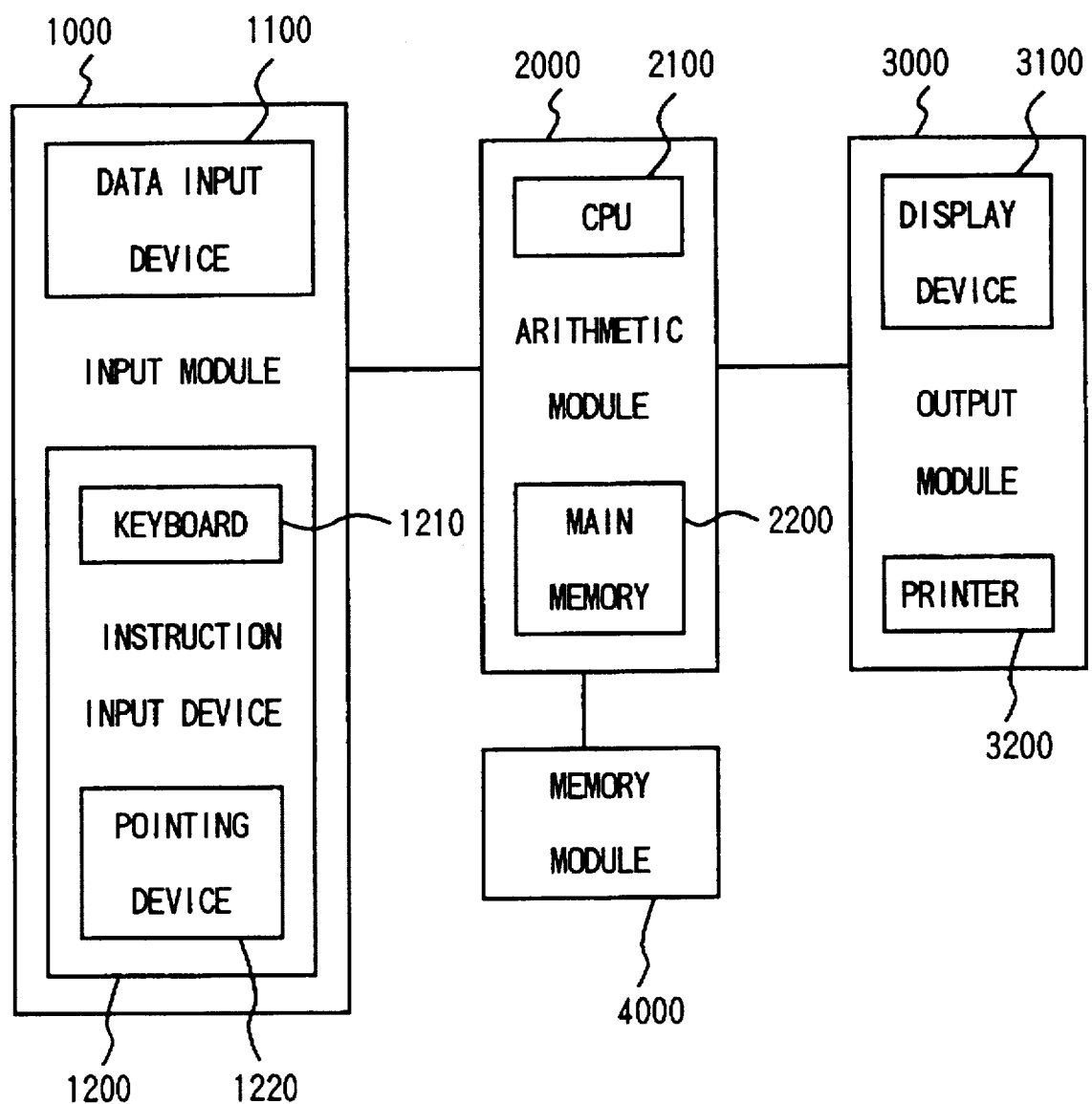
FIG. 5 is a diagram showing the architecture of a CAD (computer-aided design) system in an embodiment of the present invention.

The first embodiment of the present invention consists in a computer-aided design system (CAD system) to which a drawing information processing method according to the present invention is applied. As illustrated in FIG. 5, this system is constructed having a hardware architecture which comprises an input module 1000, an output module 3000, an arithmetic module 2000 and a memory module 4000. The input module 1000 includes a data input device 1100 which is used for inputting the data of an object to-be-designed, etc., and an instruction input device 1200 which is used for inputting various instructions, editing data, etc. The data input device 1100 is configured of, for example, a magnetic disk drive assembly or a communication device. The instruction input device 1200 is configured of, for example, a keyboard 1210, and a pointing device 1220 such as mouse, light pen or touch panel. At least, a display device 3100 such as CRT display is prepared as the output module 3000. If necessary, a printer 3200 or the like is employed. The arithmetic module 2000 includes, for example, a central processing unit (CPU) 2100 and a main memory 2200. A memory of large storage capacity, such as magnetic disk memory, is employed as the memory module 4000.

The hardware system is controlled by operating software programs run by the arithmetic module 2000, and as a result thereof, operates as: a saving device for saving information on the drawings of the object to-be-displayed, a display device for displaying the object to-be-displayed on a display screen on the basis of the information concerning the drawings, an input device for accepting external instructions and inputting the designation of a display method, and a device for accepting external instructions and editing data of the object to-be-displayed which is displayed by the display device. The programs are supplied from the memory module 4000, and they include programs which describe processing steps for executing various algorithms.

First, the user of the system of this embodiment can enter the data of the object to-be-designed as an input by means of the data input device 1100 of the input module 1000. On that occasion, the user should conveniently perform the input operation while displaying the object to-be-designed on the display device 3100 of the output module 3000 in the easiest to view attitude of the object. Therefore, he/she obtains the easiest to view display by designating a display method with the instruction input device 1200. For the purpose of the designation, this system includes a device for inputting the display method, together with a device for inputting the data of the object to-be-designed. The device for inputting the data of the object to-be-designed and the device for inputting the display method are constructed by the input module 1000, arithmetic module 2000 and output module 3000.

The device for inputting the display method is, for example, a device for designating the name of the part of the object to-be-designed so as to give an instruction, such as "Display" or "Don't Display" the part. The input device includes, for example, a device for instructing a selected one of a number of display directions prepared beforehand, such as a "forward direction" and a "sideward direction"; a device for numerically instructing the direction of the line of sight, a reference visual point, a vertical direction, etc., in order to display the part in any desired direction; and a device for rotating the part so as to alter the aspect at which the part is currently displayed. Further, the input device includes a device for instructing the position on the screen of the display device 3100 and that size at which the object to-be-designed is to be displayed.

Figure 6:
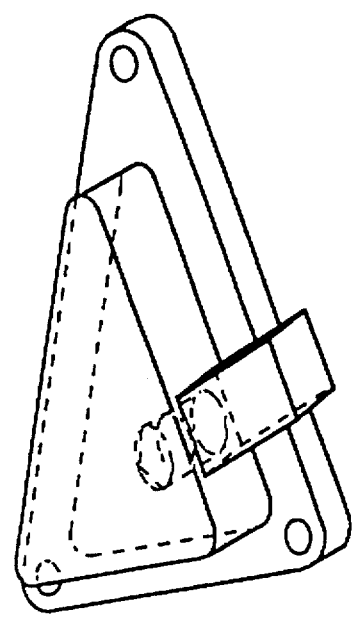
FIG. 6 exemplifies the display of a perspective assembly drawing.
Figure 7:
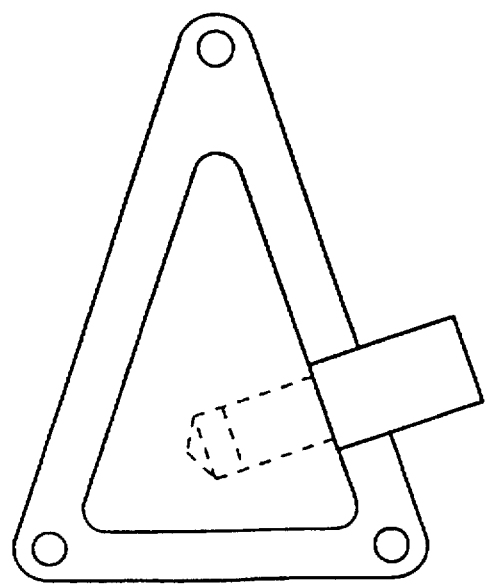
FIG. 7 exemplifies the display of a front assembly drawing.
Figure 8:
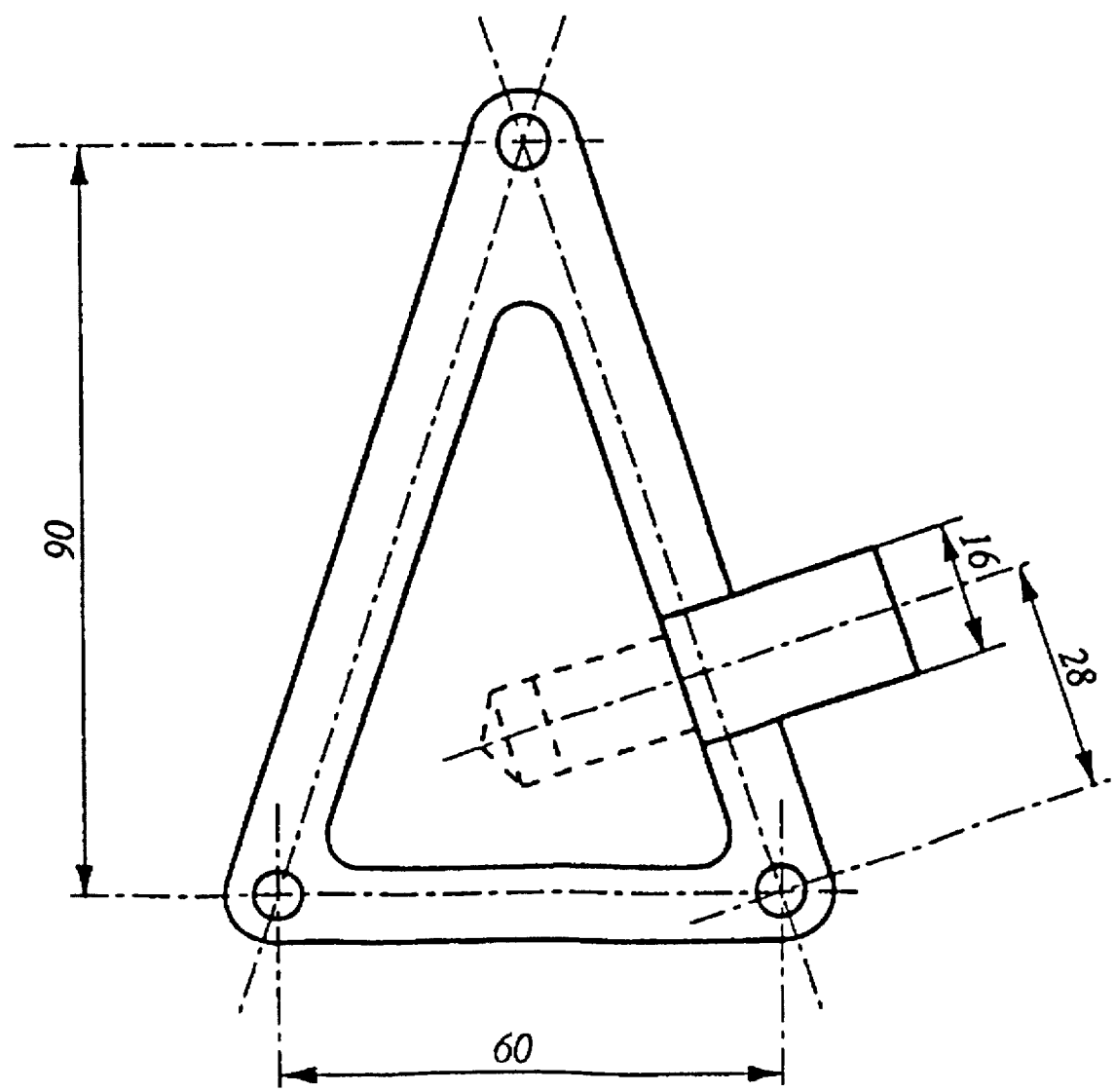
FIG. 8 exemplifies the display of a front assembly drawing which bears dimensions (namely, lengths)
Figure 9:
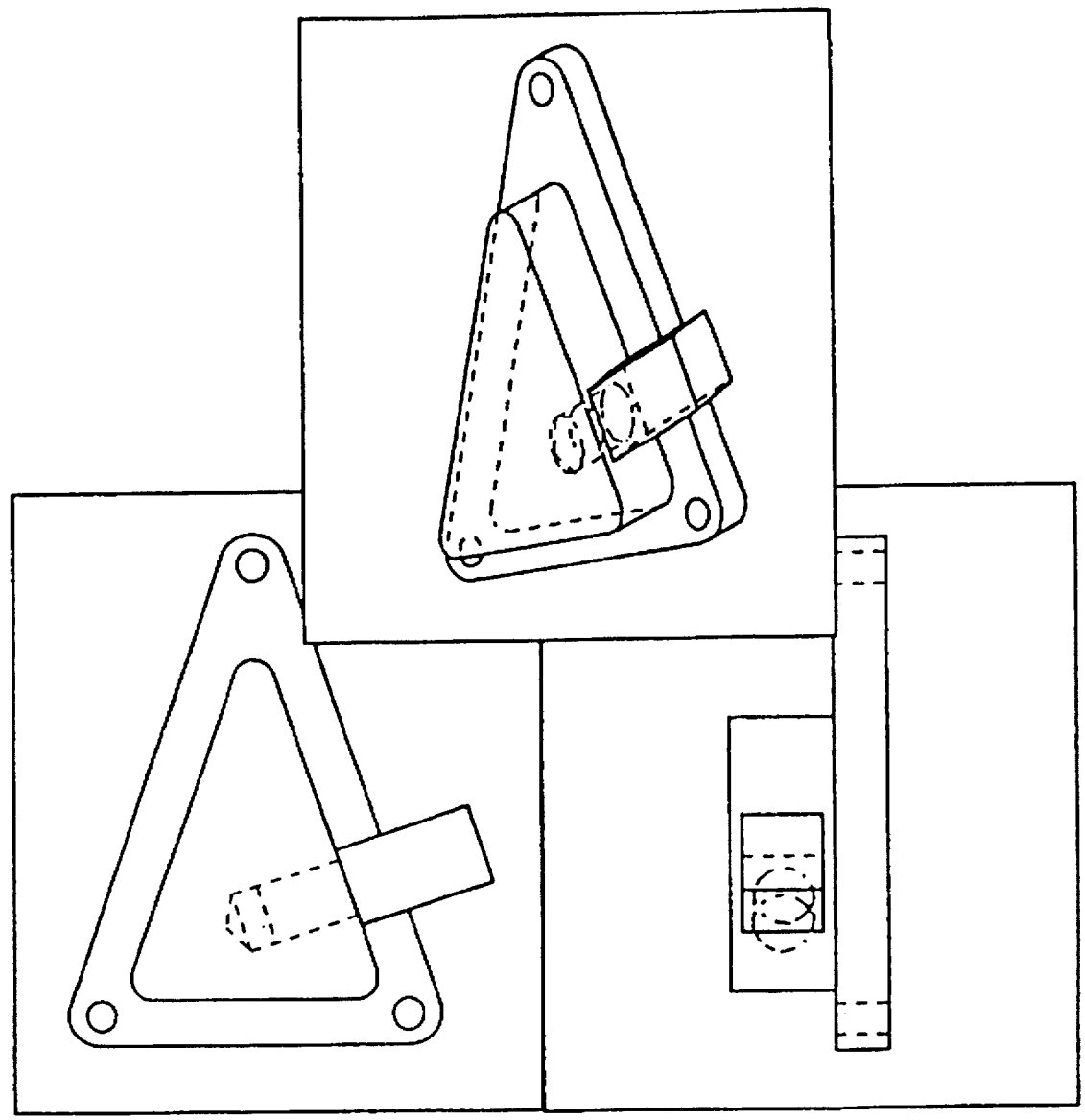
FIG. 9 exemplifies a display which contains a plurality of assembly drawings.
Figure 10:
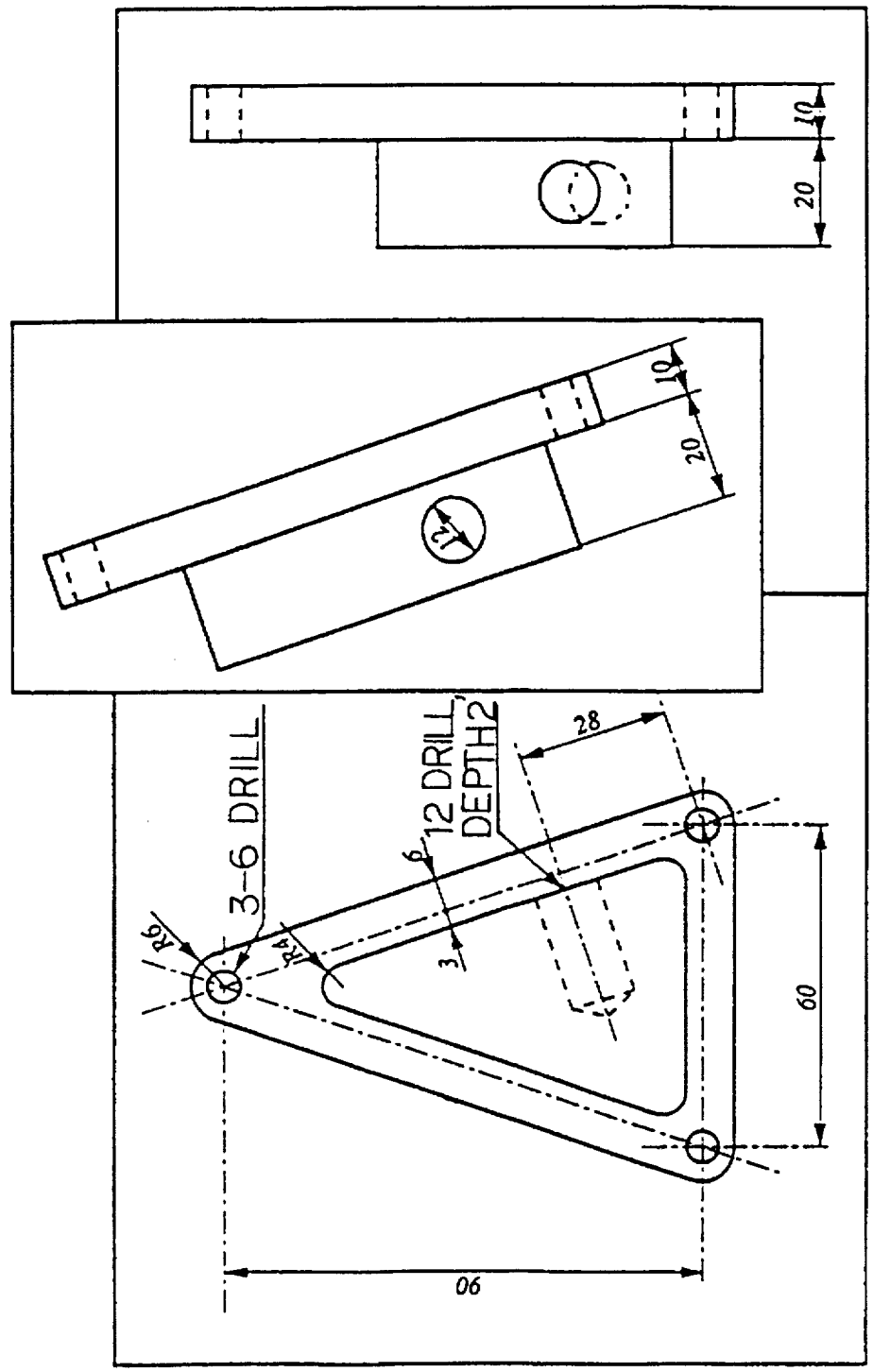
FIG. 10 exemplifies a display which contains a plurality of part drawings.

By way of example, when the user designates the display method such that the whole model is displayed as a perspective view, a drawing as shown in FIG. 6 can be displayed and referred to. When he/she designates the display method such that the whole model is displayed as a front view, a drawing as shown in FIG. 7 can be displayed and referred to. In addition, whether or not the information items of dimensions (namely, lengths), etc., are to be displayed can be designated by the designation of the display method as may be needed. Herein, when the display is designated by way of example, the information items are displayed as shown in FIG. 8. Further, drawings conforming to a plurality of display methods can be arrayed and displayed on the single screen as illustrated in FIG. 9. Still further, when the user designates the display method such that only the specified part of the object to-be-designed is displayed, a part drawing which corresponds to the pertinent part can be displayed and referred to. In this case, drawings conforming to a plurality of display methods can also be arrayed and displayed on the single screen as illustrated in FIG. 10. Owing to such methods, in displaying an assembly drawing by way of example, the user can give an instruction so as to display only the principal dimensions (namely, lengths), and in displaying a part drawing, he/she can give an instruction so as to display all dimensions (namely, lengths) concerning the pertinent part of the object. It is also possible to display a perspective assembly drawing in which the object is viewed from a certain oblique plane.

The device for inputting such display methods is included in this system. The present invention, however, does not restrict the input device to the methods stated above.

The user can save data at the stage at which he/she has input some or all of the necessary data. For the purpose of a saving separation, the system of this embodiment includes a device for saving the data. The saving device saves the data of the object to-be-designed and the data of the display methods, and it is constructed by the memory module 4000 and the arithmetic module 2000. The data items of the display methods to be saved by the saving device also contain correspondence data in order to represent which of the objects to-be-designed the display methods belong to. Accordingly, in a case where the user starts using the system again after having temporarily stopped, the designation of any of the objects to-be-designed by the name or the like thereof realizes the display of the particular object to-be-designed based on the display method already designated therefor. In this case, when data for specifying the display method in the last display of the particular object to-be-designed is also saved, the data items of the object to-be-designed are displayed in the same state as in the last operation, and the continuation of the operation is possible.

The contents of the data items which are saved will be explained in detail with reference to FIGS. 11 and 12.

Figure 11:
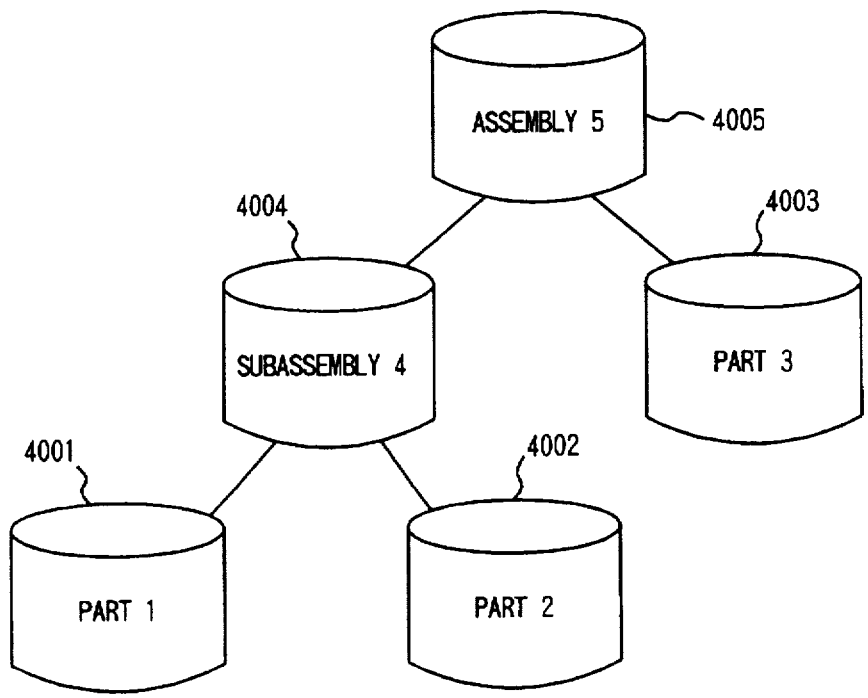
FIG. 11 is a diagram showing an example of the tree structure of the data.

FIG. 11 illustrates the data of the object to-be-designed. The data of the object to-be-designed is constructed as individually independent data items of parts, a subassembly and an assembly which constitute the product. In the example of FIG. 11, the data items of the part 1, part 2 and part 3 record the forms, dimensions (namely, lengths), etc., of only the respectively corresponding parts. In addition, the data of the subassembly 4 records the fact that this subassembly is constructed by assembling the part 1 and the part 2, data indicating the arrangement positions of the respective parts, dimensions for designating the distance and angle between the part 1 and the part 2, etc. Likewise, the data of the assembly 5 records the fact that this assembly is constructed by assembling the subassembly 4 and the part 3, data indicating the arrangement positions of the respective constituents, dimensions for designating the distance and angle between the part 3 and each part included in the subassembly 4, etc. These data items are respectively stored as object data files in the memory module 4000; and they are transferred to the main memory 2200 of the arithmetic module 2000 as may be needed. In the example shown in FIG. 11, the files provided consist of part files 4001, 4002 and 4003, a subassembly file 4004, and an assembly file 4005.

Information on each object to-be-designed is expressed as three-dimensional form data. A "form" is made up of a surface (e. g., face), a line (e. g., edge) and points (e. g., vertices). The "surface" is expressed as having a shape which is surrounded with the line or lines, while the "line" is expressed as having a shape which connects the points. The "point" is expressed as coordinate values in a three-dimensional space. It is to be understood, however, that the present invention need not restrict the data of the object to-be-designed to this format. The information items to be dealt with as the data are likewise not restricted to the form and the dimensions (length and angle).

Figure 12:
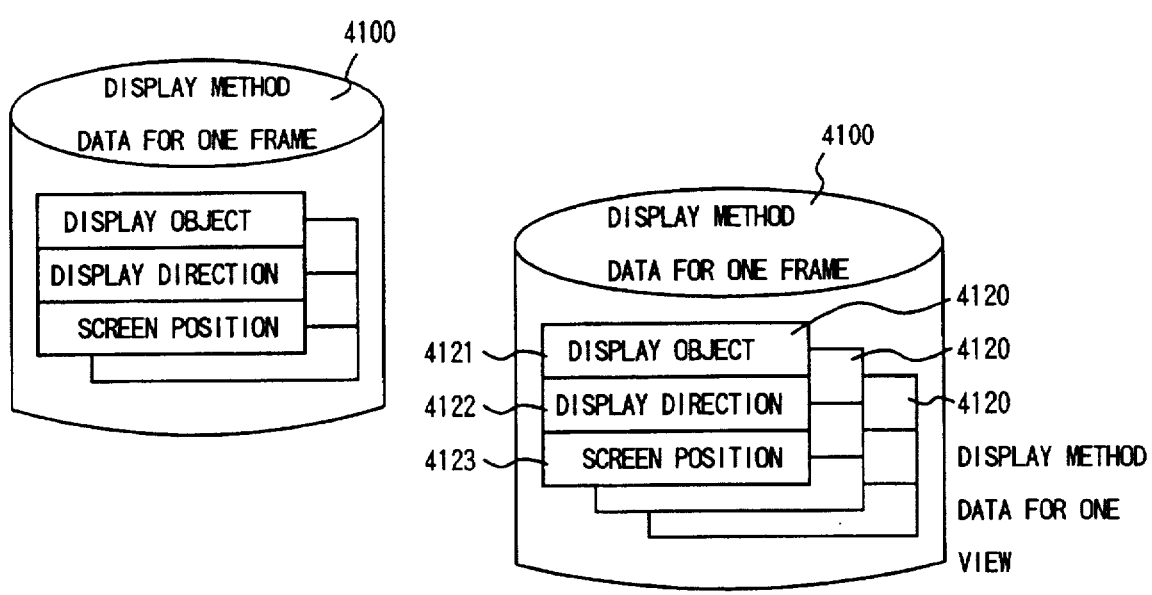
FIG. 12 exemplifies data on display methods.
Figure 13:
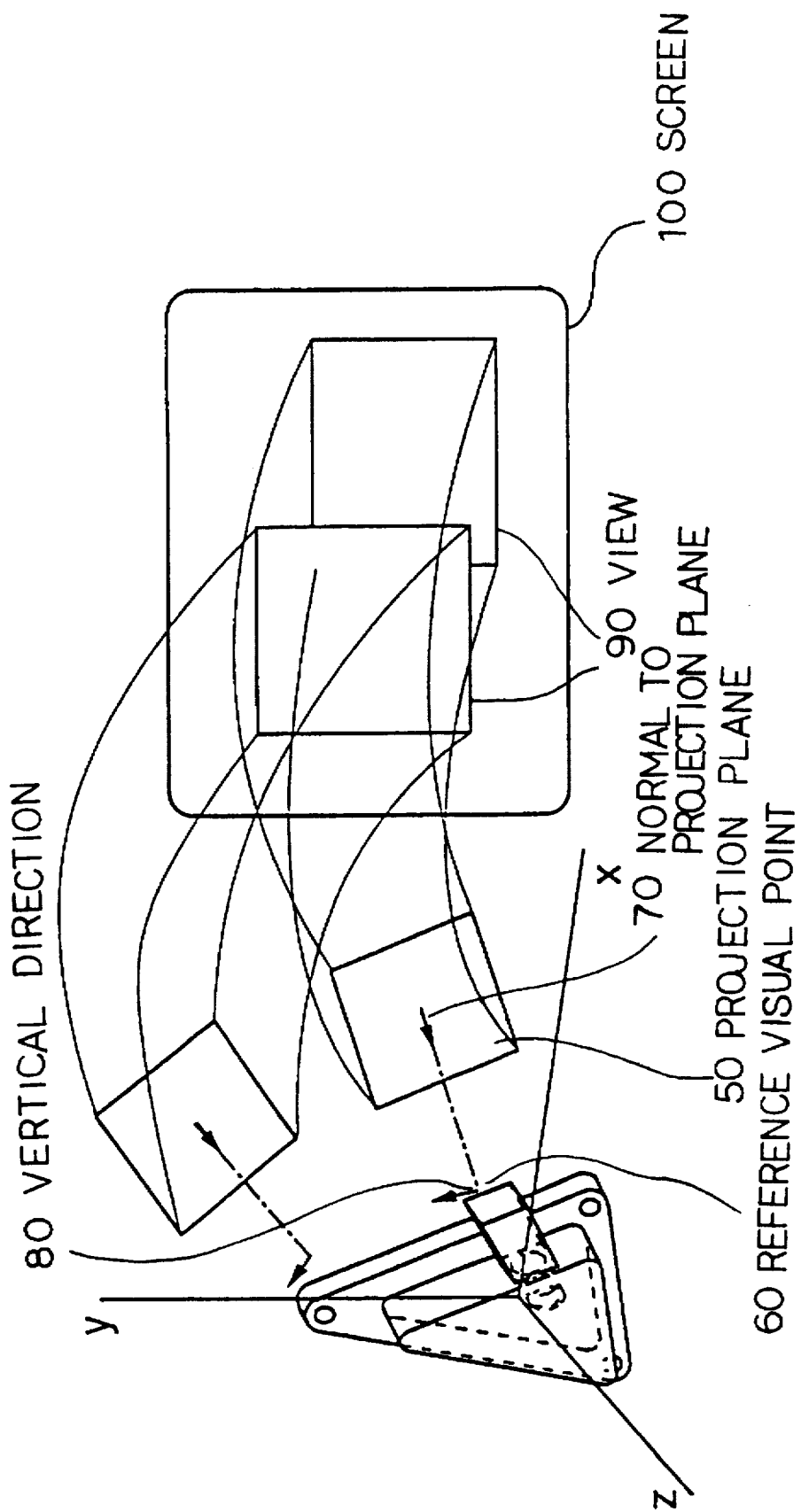
FIG. 13 is a diagram for explaining a display method.

FIG. 12 illustrates the data items of the display methods. The data items are constructed as sets of individually independent display method data, each set being displayed as one frame at one time, and the respective sets are stored as display method data files 4100 in the memory module 4000. Each of the sets is composed of combinations of data 4120 equal in number to the views 90 which are to be displayed on a screen 100 as illustrated in FIG. 13. The combination of data 4120 corresponding to each view is constituted by display object data 4121, display direction data 4122, and screen position data 4123.

The display object data 4121 indicates that/those kind(s) of data of the part(s), subassembly or/and assembly which is/are to be displayed. It indicates, for example, the form and dimensions (lengths, etc.) of the part 1; the forms of the subassembly 4, part 1 and pan 2 and the dimensions (lengths, etc.) of the subassembly 4; or the data items of the assembly 5 and all the constituents thereof. As shown in FIG. 13 by way of example, the data 4122 of a display direction contains the coordinate values of a reference visual point 60 for indicating the position of the object to-be-displayed, a vector in the direction 70 normal to a projection plane 50 (this direction being opposite to the display direction) for indicating the direction of the line of sight, the distance between the reference visual point 60 and the projection plane 50, a vector in a vertical direction 80 for indicating the upward direction of an image to-be-displayed, and a clipping frame data for limiting a portion which is to be actually displayed. Also, as shown in FIG. 13 by way of example, the screen position data 4123 contains the height and width of the view 90, and the central position of the view 90 on the screen 100. It is to be understood, however, that the present invention is not restricted to the format of the data of the display method. The information items to be dealt with as the data are not restricted to the projection method (as to whether or not a sectional view is displayed), either. Regarding the designation of the display, the designation of all the data items of the same kind is not restrictive, but individual data items may well be separately designated.

Incidentally, such data contents are explained in, for example, Hiroaki Chiyokura: "Solid Modeling", pp. 127–131, published by Kabushiki-Kaisha Kogyo Chosa-kai, and S. Hallinton: "Computer Graphics [II] based on Algorithms and Programs" translated by Akira Koriyama and Tatemasa Ohya, pp. 289–345, published by McGraw-Hill Books Kabushiki-Kaisha.

In some cases, the user wants to refer to the displays of an identical object presented by a plurality of different display methods. The most typical example is a case where the data items of an assembly have been input in advance, and where different display methods are respectively employed for viewing the whole assembly and for viewing any part of the assembly. The system of this embodiment can deal with the plurality of different display methods. Specifically, it includes the device for saving a display method at any desired time in the memory module 4000. On this occasion, even when a display method different from the current display method has already been saved, the current display method can be saved as another display method. The data to be saved contains the display object data, by which the display method data is associated with the object data.

When the system is operated using the data saving device as stated above, three sets of data are saved in the memory module 4000. The three sets of data consist of one set of data of an object to-be-designed, and two sets of data of display methods. According to this system, the data saving device can save any desired number of sets of display method data in correspondence with one set of data of the object to-be-designed, and it can also save a plurality of sets of data of the object to-be-designed in association with a plurality of sets of display method data.

Figure 1:
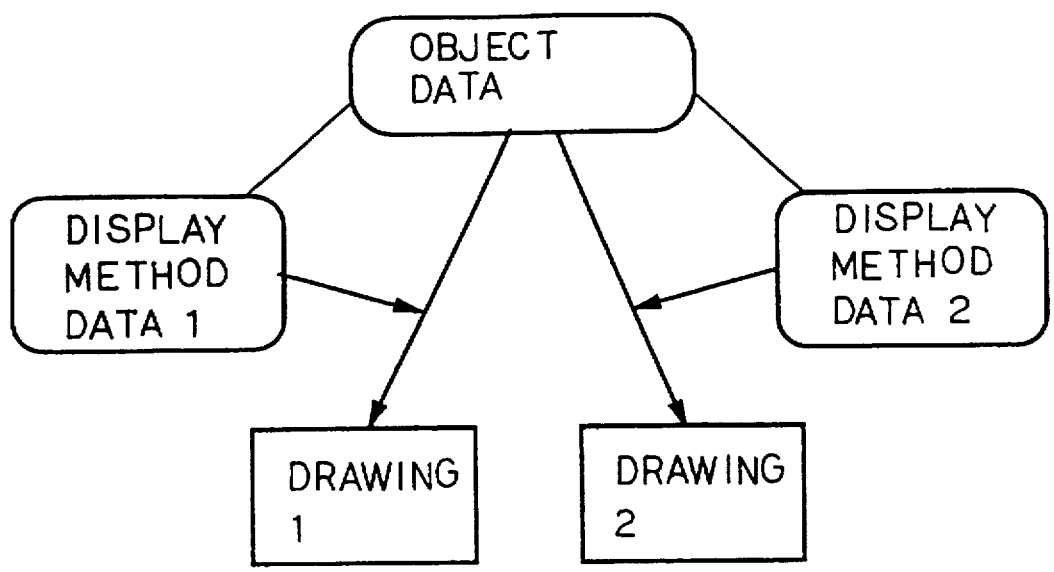
FIG. 1 is a diagram showing a data displaying method which adopts the present invention.

When the data items have been saved in this manner, one set of data of the object to-be-designed and the plurality of sets of display method data associated therewith can be used for displaying drawings equal in number to the sets of display method data as illustrated in FIG. 1. As to this display processing, there is also considered an expedient in which two-dimensional image data is generated from the data of the object and is then displayed. Herein, the display method data can be regarded as image generation method data.

Figure 14:
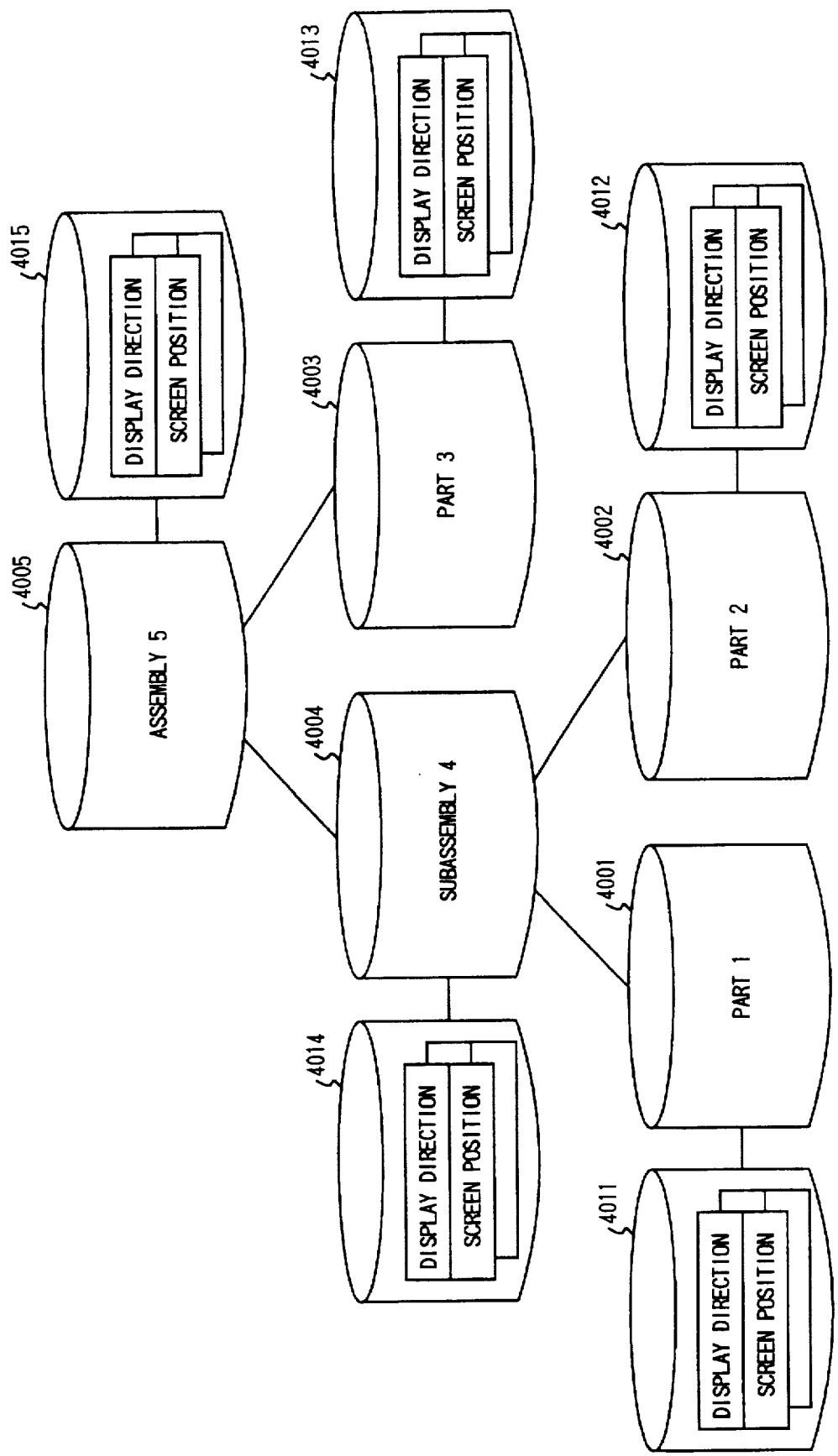
FIG. 14 is a diagram showing another example of the tree structure of the data.
Figure 15:
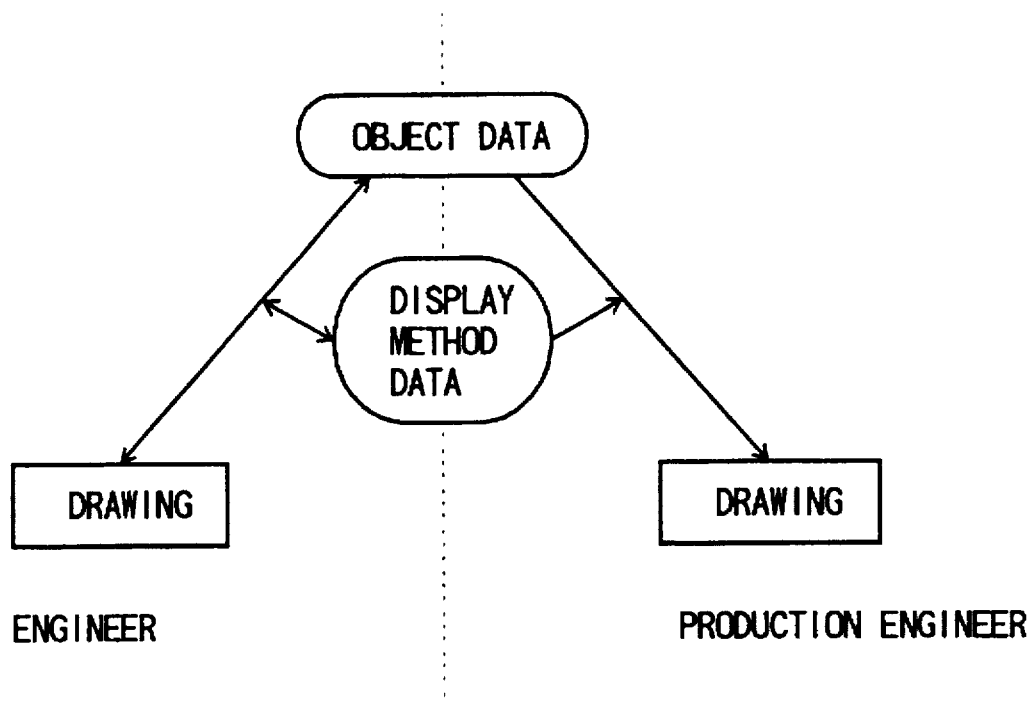
FIG. 15 is a diagram showing another example of an information transferring method in the prior art.

The second embodiment of the present invention consists in a CAD (computer-aided design) system which is similar to the first embodiment. The system architecture of hardware elements employed is the same as shown in FIG. 5. The point of difference is that, as illustrated in FIG. 14, display method data items are saved as belonging to the data of a part or an assembly. Since a display method for the assembly is often determined by the part or the assembly which serves as the unit of display, the expedient of this embodiment is intended to facilitate the determination of the display method. More specifically, the data of a display method in the case of dealing with the single part is saved as belonging to the data of the pertinent part, while the data of a display method in the case of dealing with the assembly is saved as belonging to the data of the pertinent assembly. As shown in FIG. 14, this embodiment is also provided with part files 4001, 4002 and 4003, a subassembly file 4004 and an assembly file 4005 as object data files. The part file 4001 of a part 1 is furnished with a file 4011 for the display method data of the part 1, the part file 4002 of a part 2 with a file 4012 for the display method data of the part 2, and the part file 4003 of a part 3 with a file 4013 for the display method data of the part 3. Besides, a file 4014 for the display method data of a subassembly 4 is disposed in correspondence with the subassembly file 4004, while a file 4015 for the display method data of an assembly 5 is disposed in correspondence with the assembly file 4005.

Figure 2:
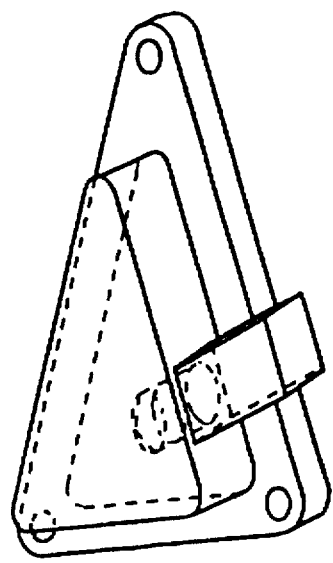
FIG. 2 is a schematic perspective view showing an example of an object to-be-designed.
Figure 3:
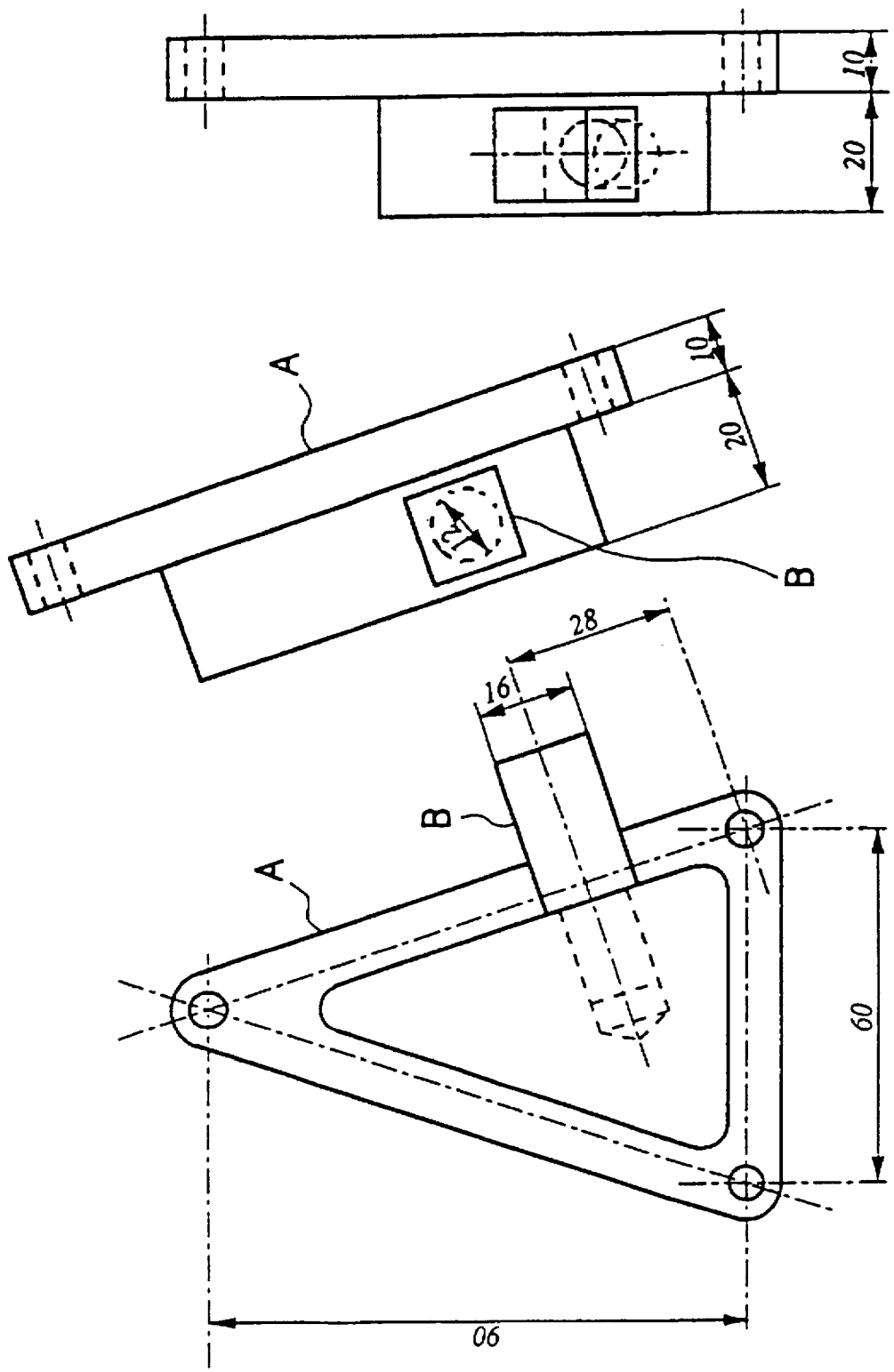
FIG. 3 is a diagram showing an example of a design drawing.
Figure 4:
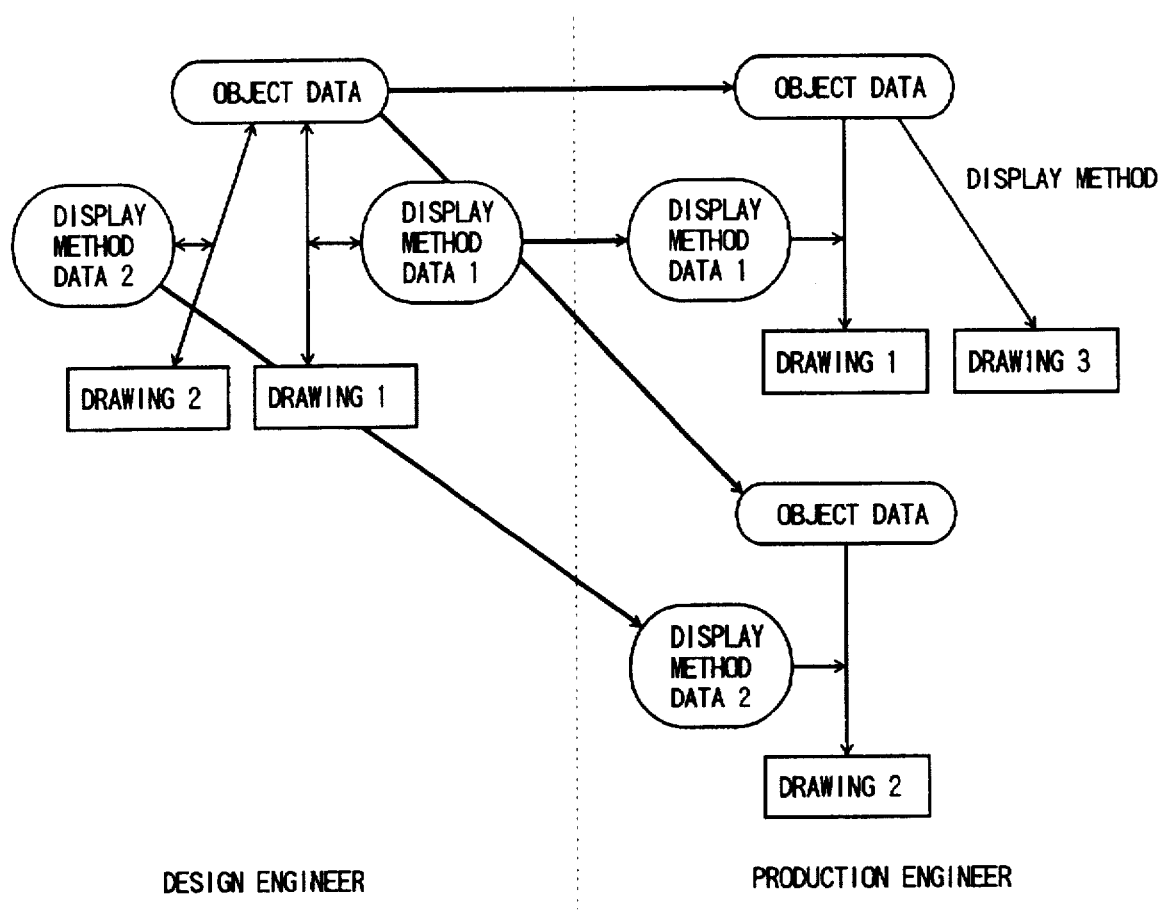
FIG. 4 is a diagram showing an example of an information transferring method in the prior art.

By way of example, in a case where the object to-be-designed shown in FIG. 2 is displayed and dealt with in the assembled state thereof, the display method data thereof is recorded as belonging to the object data which corresponds to the assembly. On the other hand, in a case where one part derived from the object to-be-designed is displayed and dealt with individually, the display method data thereof is recorded as belonging to the object data of the pertinent part. As a result, when the user gives the mere instruction of displaying the whole object to-be-designed, the display method data is also displayed in the aspect in which it belongs to the object data of the assembly, without the designation of any display method. Likewise, when the user gives the mere instruction of displaying one part, the display method data is also displayed in the aspect in which it belongs to the object data of the pertinent part, without the designation of any display method.

In order to realize such functions, the CAD system of this embodiment includes a device for saving the data of an object to-be-designed and the data of a corresponding display method in association when the instruction of saving the data of the object to-be-designed has been given, and a device for fetching the data of the object to-be-designed and the data of the display method saved in association with the object data and then displaying the data of the object to-be-designed in conformity with the fetched display method when the instruction of restoring the data of the object to-be-designed has been given. The device for associatively saving the data of the object to-be-designed and the data of the corresponding display method is constructed by, for example, the arithmetic module 2000 and the memory module 4000 shown in FIG. 5. The device for displaying the data of the object to-be-designed is constructed by the arithmetic module 2000 and the output module 3000. Also, the device for displaying the data of the object to-be-designed is constructed by the arithmetic module 2000 and the display device 3100 which originate display data for the data of the object and display the originated data in conformity with a designated display method.

An expedient in which the above embodiment is further extended to bring a plurality of display methods into correspondence with one part or one assembly, shall also be covered within the scope of the present invention. Hereunder, such an embodiment will be described in more detail through specific operations. Incidentally, a hardware system which is employed for realizing this embodiment is, for example, as shown in FIG. 5 similarly to those of the embodiments previously described. Also, software elements which are run in the hardware system so as to realize various devices include the same programs as in the foregoing embodiments, in addition to programs peculiar to this embodiment.

Figure 16:
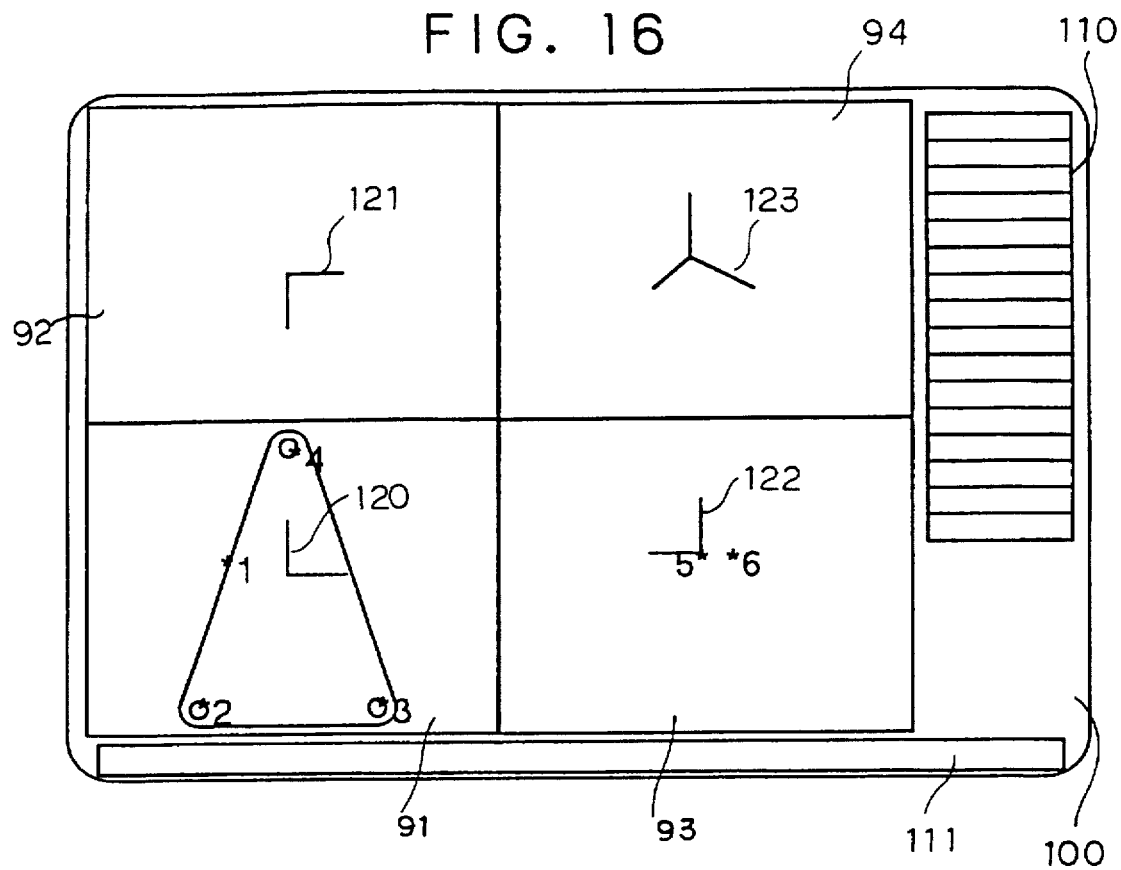
FIG. 16 shows an example of the operating frame of the CAD system.

Upon initializing the design of an object, an operating frame as shown in FIG. 16 is displayed on a screen 100. More specifically, all articles to-be-displayed are displayed on the screen 100. Numeral 110 denotes a command menu for selecting any of a number of processes. When the user points to any position of the command menu 110 with the pointing device 1220 such as the mouse or light pen, the arithmetic module 2000 detects the pointed position and executes the process corresponding to the information of the pointed position. The present invention, however, is not restricted to this method of selecting a process.

Numeral 111 denotes a message area for displaying the result of a process, a guide for an operation, etc. This area is not essential to the present invention, but a device for giving a prompt to the user is usually required. Numerals 91, 92, 93 and 94 denote views which represent the object to-be-designed as seen from the front side thereof, from the top side thereof, from the right side thereof, and obliquely from above, respectively. The present invention, however, is not restricted to the facts that the four views are provided or that the views are displayed in the illustrated directions. If at least one view is existent, the display operation is possible. Moreover, even if no view exists in the initial state of the operating frame on the screen 100, a view or views can be originated in compliance with the user's instruction by a device prepared for originating the view or views. Shown at numerals 120, 121, 122 and 123 are coordinate axes which serve to guide positions and directions. They are not indispensable to the present invention, either, but they should preferably be displayed in order that the user may more efficiently operate the system.

In the illustrated state of the operating frame, the user's input of the name of a part to be originated is subsequently accepted. Specifically, the user picks or selects a command for designating the name of an input part, by pointing to the corresponding portion of the command menu 110. Then, the CAD system requests the user to supply the name of the part as an input, in the message area 111 of the screen 100. Here, when the part name is input from the keyboard 1210 or the like, the name of the pertinent part is stored in the main memory 2200, and the subsequent processing is directed toward the designated part. On this occasion, the system affixes an identification No. ("id No.") to the part for the purpose of management. Such id Nos. are unique Nos. which are different for all parts including the parts saved in the files. In a case where this command is not carried out, the system automatically determines a tentative proper part name, on the basis of which the subsequent processing is executed. Here, it is assumed for the ensuing description that the user has input "body" as the part name.

At the next step, the user supplies form data as an input in two dimensions. The method of this step is the same as a method performed in many conventional CAD systems, and is not essential to the present invention. Specifically, the user picks a command for drawing a straight line and appoints the positions of two points at both ends of the straight line, and picks a command for originating a circle and appoints the positions of the center of the circle and one point on the circumference thereof.

Figure 17:
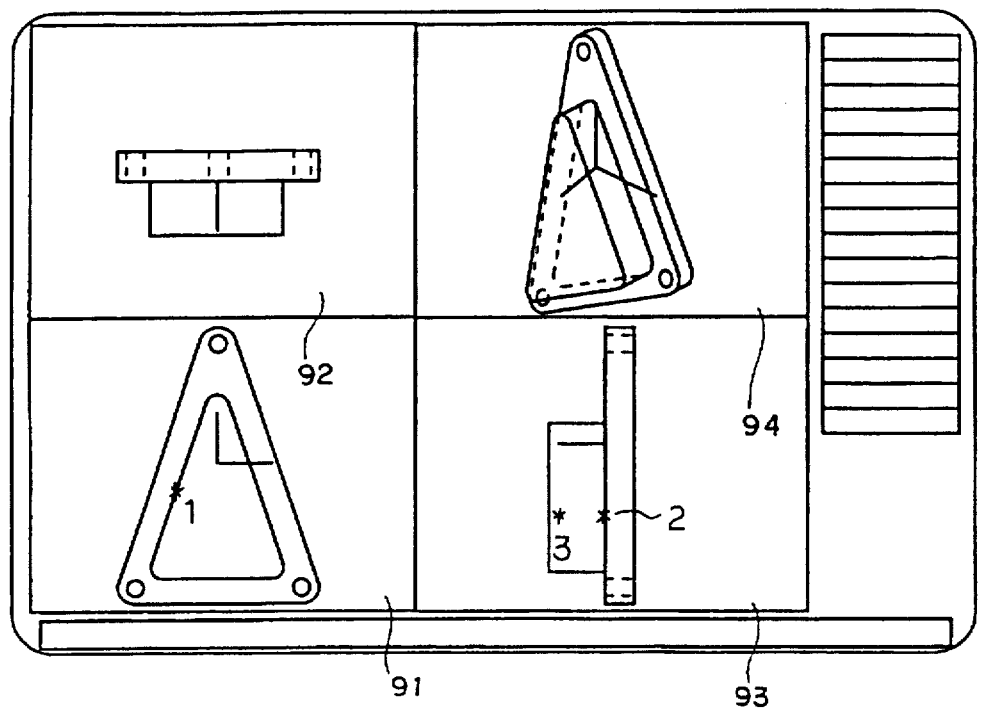
FIG. 17 shows another example of the operating frame of the CAD system.

Subsequently, a three-dimensional form is originated by utilizing the two-dimensional form originated above. More specifically, after an outer peripheral shape 1 and hole shapes 2, 3 and 4 are designated in one (91) of the views as shown in FIG. 16, two positions 5 and 6 indicating the depth of the body of the object to-be-designed are appointed in this order in another (93) of the views. As a result, the three-dimensional form having a single thickness as illustrated in FIG. 17 is generated, and it is displayed as four views 91, 92, 93 and 94 set as drawings viewed in the four directions.

Next, the user supplies the two-dimensional form of the protrusion of the body as an input in the view 91. Further, a three-dimensional form is originated by utilizing the originated two-dimensional form. More specifically, after an outer peripheral shape 1 is designated in the view 91, two positions 2 and 3 indicating the depth of the body are appointed in this order in the view 93. In this example, no hole shape exists, and hence, it is not designated. As a result, as illustrated in FIG. 17, the three-dimensional form is generated and is displayed as the four views 91, 92, 93 and 94.

Figure 18:
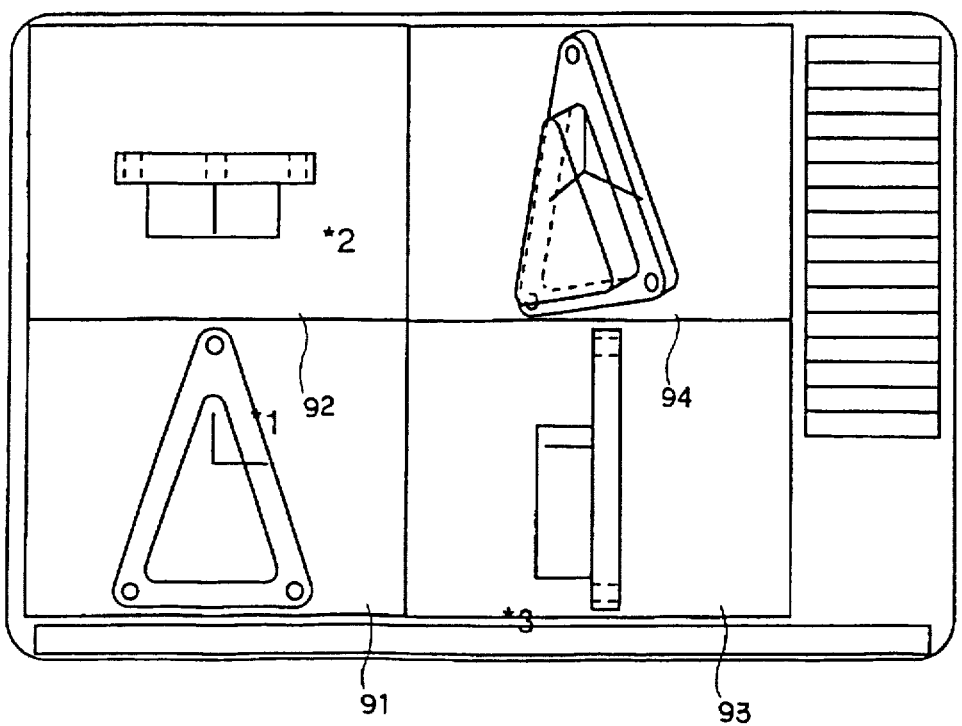
FIG. 18 shows still another example of the operating frame of the CAD system.
Figure 19:
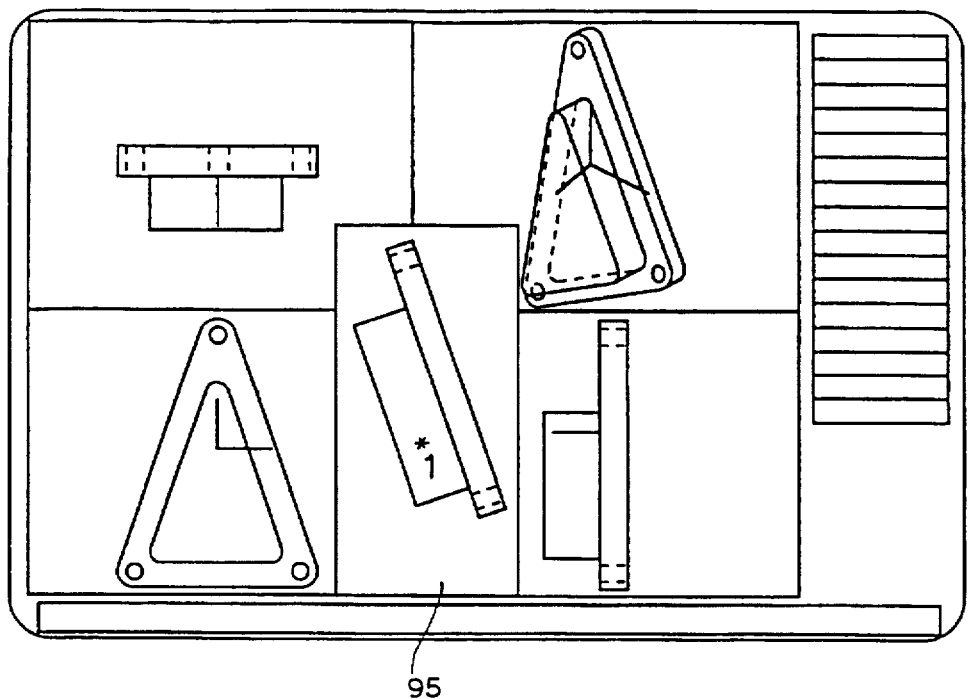
FIG. 19 shows yet another example of the operating frame of the CAD system.

At the step of FIG. 18, as preprocessing for providing a hole in a slant surface, the user performs an operation for generating a view which is seen in a direction perpendicular to the slant surface. This corresponds to the instruction that a view in a direction in which a surface indicated at numeral 1 in a view 91 is perpendicularly seen is originated in an oblong region which contains diagonal positions 2 and 3. When such an instruction is given, the display device additionally generates a new view 95 as shown in FIG. 19 in the system of this embodiment.

The next step is the operation of providing the hole in the part currently dealt with, namely, the "body" of the object to-be-designed. Here, in this example, the user picks a command for providing a drilled hole and thereafter supplies the central position 1 of the hole and the diameter and depth thereof as inputs in the view 95. Since the diameter and the depth are input from the keyboard 1210 of the input module 1000, the situation of the input operation is not displayed on the screen 100.

Figure 20:
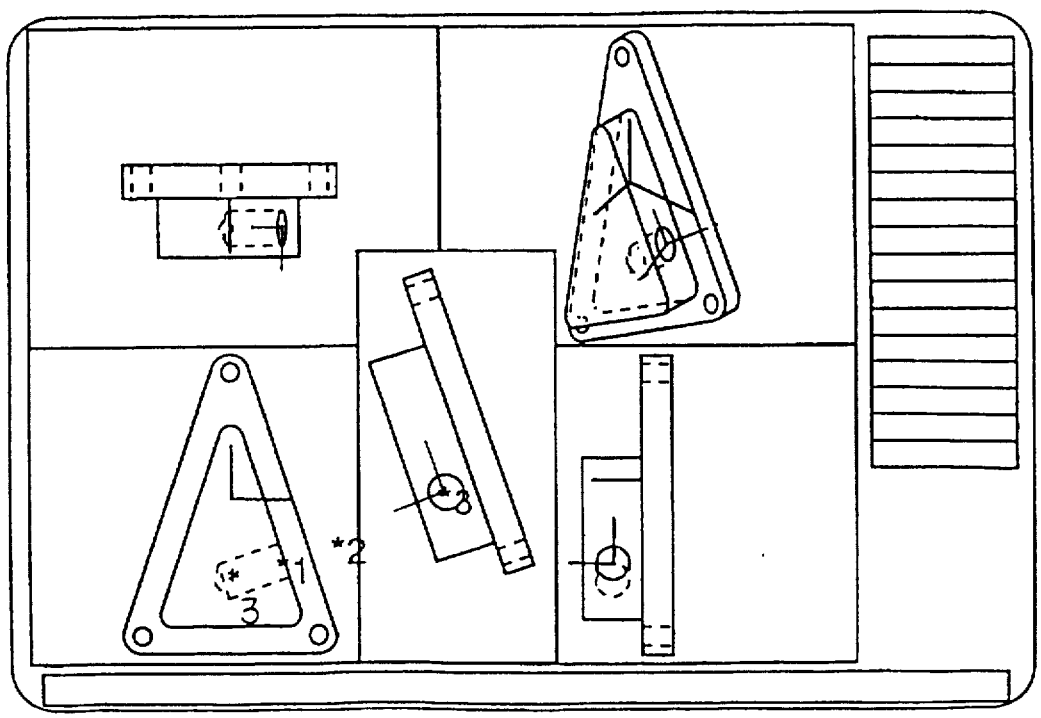
FIG. 20 shows a further example of the operating frame of the CAD system.

In FIG. 20, the five views 91, 92, 93, 94 and 95 are displayed in the form in which the body is provided with the hole.

The input operation concerning the form of the first part or the "body" is ended by the assumed user's operations stated above and the processes of the system attendant upon them. Subsequently, processes similar to those used for the "body" are performed in order to generate the form of the second part, or "knob", of the object to-be-designed.

First, the user picks the command for designating the name of an input part, by pointing to the corresponding portion of the command menu 110. Then, the CAD system of this embodiment requests the user to supply the name of the part as an input, in the message area 111. Here, when the part name "knob" is input from the keyboard 1210, the name of the pertinent part is stored in the main memory 2200, and the subsequent processing is directed toward the designated part.

Since the new part "knob" lies obliquely in the whole assembled machine, it is difficult to process when left intact in that state. Therefore, the coordinate system of the new part is altered by an operation illustrated in FIG. 20. More specifically, a point to which a position 1 and a position 3 correspond in three dimensions is set as the origin of a new coordinate system. In addition, a direction from the position 1 to a position 2 is set as the direction of the x-axis of the new coordinate system, a direction perpendicular to the x-axial direction as the direction of the y-axis, and a direction perpendicular to both the x-axial direction and the y-axial direction as the direction of the z-axis.

When the above operation has been performed, the axes of the new coordinate system are displayed as shown in FIG. 20. Further, an operation for originating the part "knob" is performed. First, in order to originate a three-dimensional form, the user points an outer periphery 1 and positions 2, 3 indicative of a depth in the views 95 and 91. Thus, the portion of the part "knob" inserted in the hole of the body is generated.

Subsequently, a regular square is originated as a two-dimensional form in the view 95 and is used as an outer periphery for designating a depth in the view 91. Then, the protrusion portion is similarly generated. That is, the knob B is mounted on the body A as illustrated in FIG. 21.

In the case of the object to-be-designed in this example, the form can be grasped without a so-called plan view in which the object is seen from above. It is therefore possible to erase the left upper view 92 corresponding to the plan view, and to alter the display positions and display sizes of the remaining views. Such an arrangement of the views will best represent the features of the object to-be-designed to the operator of the processing system.

Figure 21:
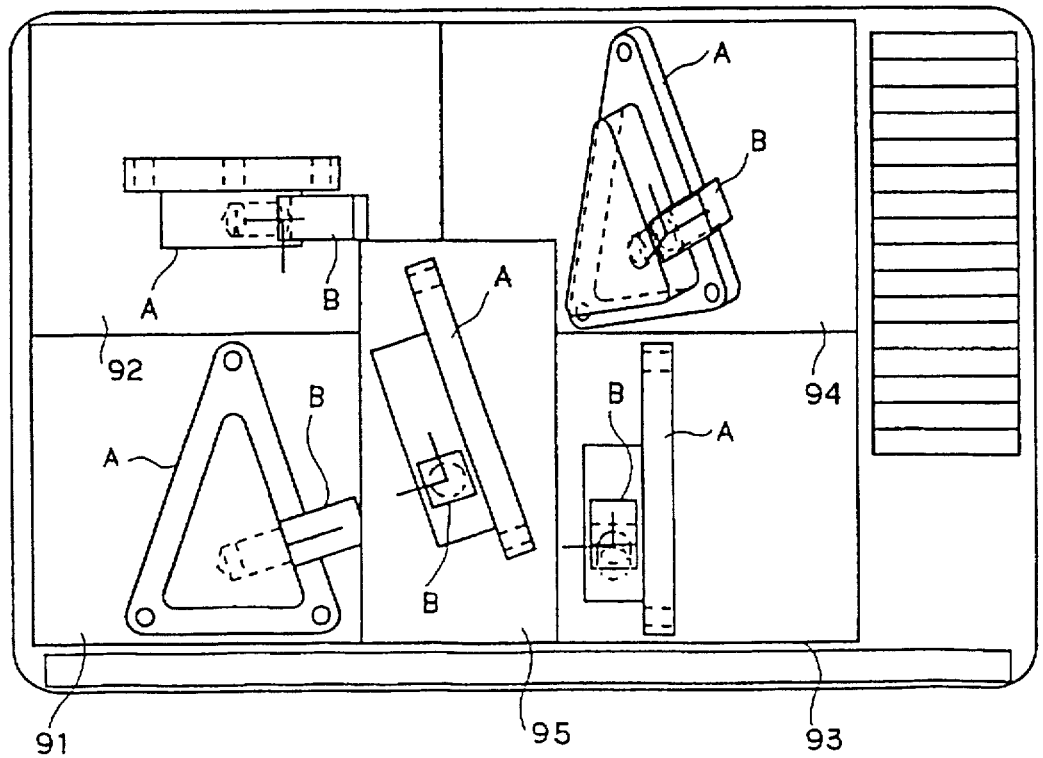
FIG. 21 shows a still further example of the operating frame of the CAD system.

In the state of FIG. 21, the data items of the "body A" and the "knob B" have already been originated as the object to-be-designed. Herein, the name of an assembly into which these two parts are combined ought to exist. Therefore, the name of the assembly is subsequently set before saving the data. In this embodiment, the system assumes a name in the absence of any particular designation by the user. Therefore, the subsequent processing will be explained assuming that the user picks a name altering command at this point in time and has designates the "general" structure as the name of the assembly.

In this state, the data items are saved because the form of the object to-be-designed has already been input. Specifically, the user picks a data saving command from the command menu 110 and affords the part or assembly to-be-saved and the arrangement of the views on the screen 100, i.e., the name of the display method as inputs through the input device. Then, a process for saving the data in the memory module 4000 is started by the saving device. Since the contents displayed in accordance with the designated display methods correspond, so to speak, to drawings, the data of the display method shall be called "drawing data" below, and the name of the display method shall be called "drawing name". Assuming here that the "general" structure and an "operation drawing" have been respectively input as the article to-be-saved and the drawing name, then the data of the single "general" assembly, the data of the two parts "body" and "knob" and the data of the display methods of the current display on the screen 100 are to be saved. The aforementioned "operation drawing" signifies a drawing which is convenient for operating or processing the object to-be-designed. The drawing name, however, can be designated quite freely by the user.

Figure 22:
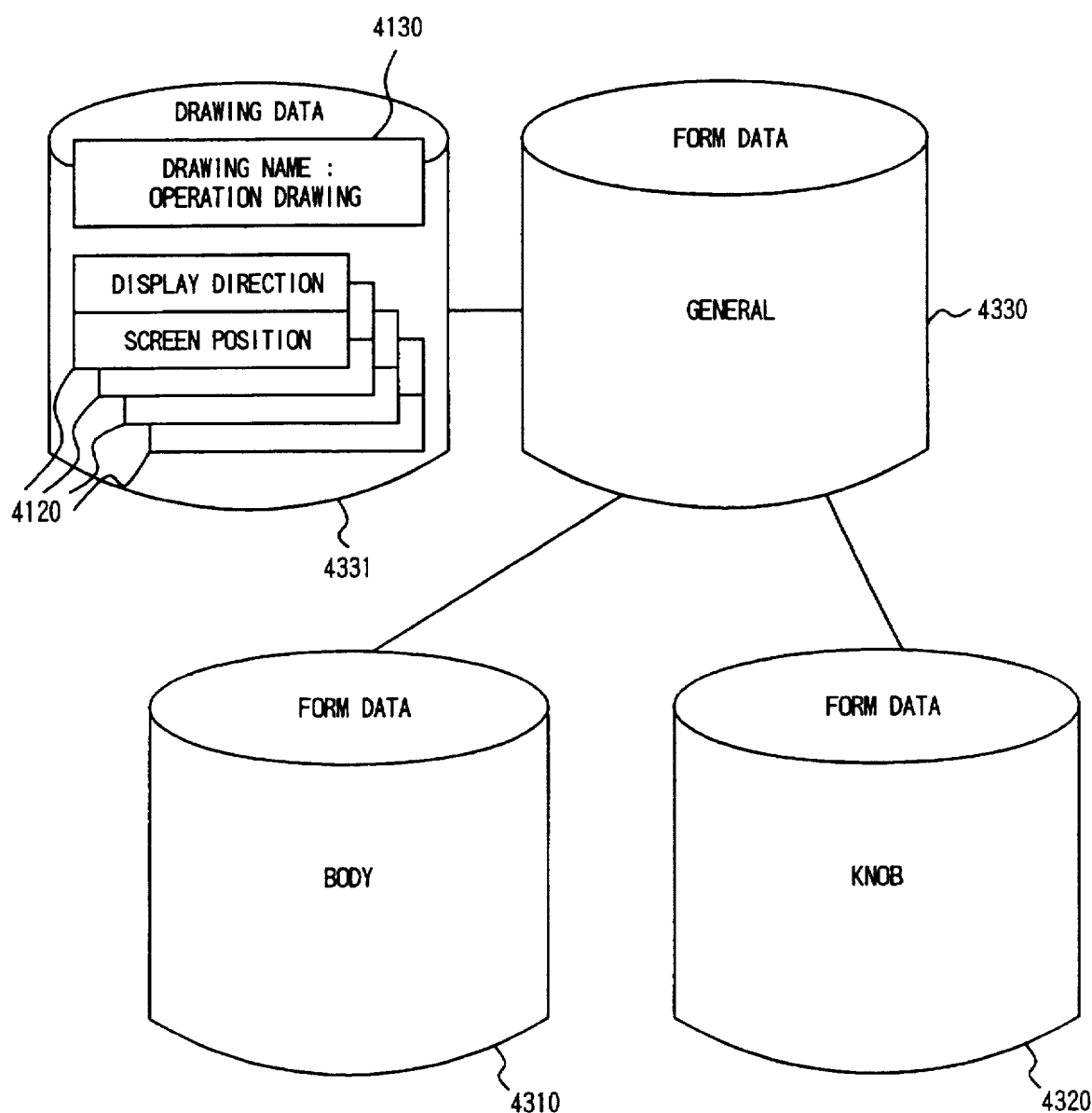
FIG. 22 is a diagram showing an example of the tree structure of saved data.

In this embodiment, these data items are saved as schematically shown in FIG. 22. The data items of the object to-be-designed, i. e., the form data items which are the three sets of data of the "general" assembly, the part "body" and the part "knob" are saved in the memory module 4000 as respectively corresponding data files 4330, 4310 and 4320. In addition, now that the four views 91, 93, 94 and 95 exist on the screen 100 and that all of them represent the "general" assembly, one set of data items of display methods, i. e., the drawing data items, which are composed of the data 4130 of the drawing name and the respective data 4120 of the four views 91, 93, 94 and 95, are saved in association with the "general" assembly as a file 4331. The details of the data to be saved, and algorithms for the saving operation will be explained later.

The frames of the respective views 91, 93, 94 and 95 can be displayed, but they may well be prevented from being displayed by the user's instruction. It is also possible to originate a frame which surrounds the whole displayed graphic. This state is an example in which a different display method is employed though the object to-be-designed for the display operation is quite identical. When, in this state, the user designates an "assembly drawing" as the drawing name and saves data again, the form data items are the same as in the case shown in FIG. 22, but one set of drawing data items associated with the "general" assembly increases to construct two drawing data files.

Moreover, in this embodiment, dimensions (namely, lengths, etc.) and center lines can be added to the model to-be-designed. In this case, the display method data is controlled by the input device, whereby drawings with the dimensions and drawings without the dimensions can be selectively generated by the use of the identical model. When the respective drawings are finally saved under different drawing names, the form data files 4310, 4320 and 4330 and four drawing data files are constructed, and corresponding data items are saved in the respective files.

Thus far, all the examples have been processed in "general" assembly units. However, when the data items as stated above are saved, it is also possible to derive any single part and to deal with the form data in single-part units. By way of example, let's consider a processing example in which the part "body" is retrieved and displayed anew after the end of an assembly operation state. In this processing, the processing system first retrieves the form data of the part "body" from within the form data files 4310, 4320 and 4330. When the pertinent form data has been found, drawing data which bears a designated drawing name is retrieved from among the drawing data items associated with the pertinent form data. In a case where the pertinent form data is not found or where no drawing name is designated, the first drawing shall be used. In a case where the associated drawing data is not existent at all, it is similarly retrieved from within the drawing data file of an assembly which is in a parental relation to the part "body". If the associated drawing data does not yet exist, it is similarly retrieved as to an assembly which is further parental to the first-mentioned assembly. In due course, in a case where the associated drawing data is not existent in spite of tracing to the most ancestral parent, the part "body" is displayed by those four views shown in FIG. 16 which constitute the standard display method. The detailed algorithms of the retrievals will be explained later.

In the case of this example, the drawing name for the retrieval is not designated, so that the first drawing data among the drawing data items associated with the designated part "body" is used. Since, however, no associated drawing data is existent here in the first drawing data, the processing proceeds to the retrieval in the parent. In the parent part being the "general" structure, four drawing data files (4331–4334) exist, and hence, a display is presented using data stored in the first drawing data file (4331). That is, the data having the drawing name "operation drawing" is used. This drawing data presents the display on the basis of the framed views and without containing dimensions (lengths, etc.). It is also possible to display only the part "body" by the use of this drawing data.

Figure 23:
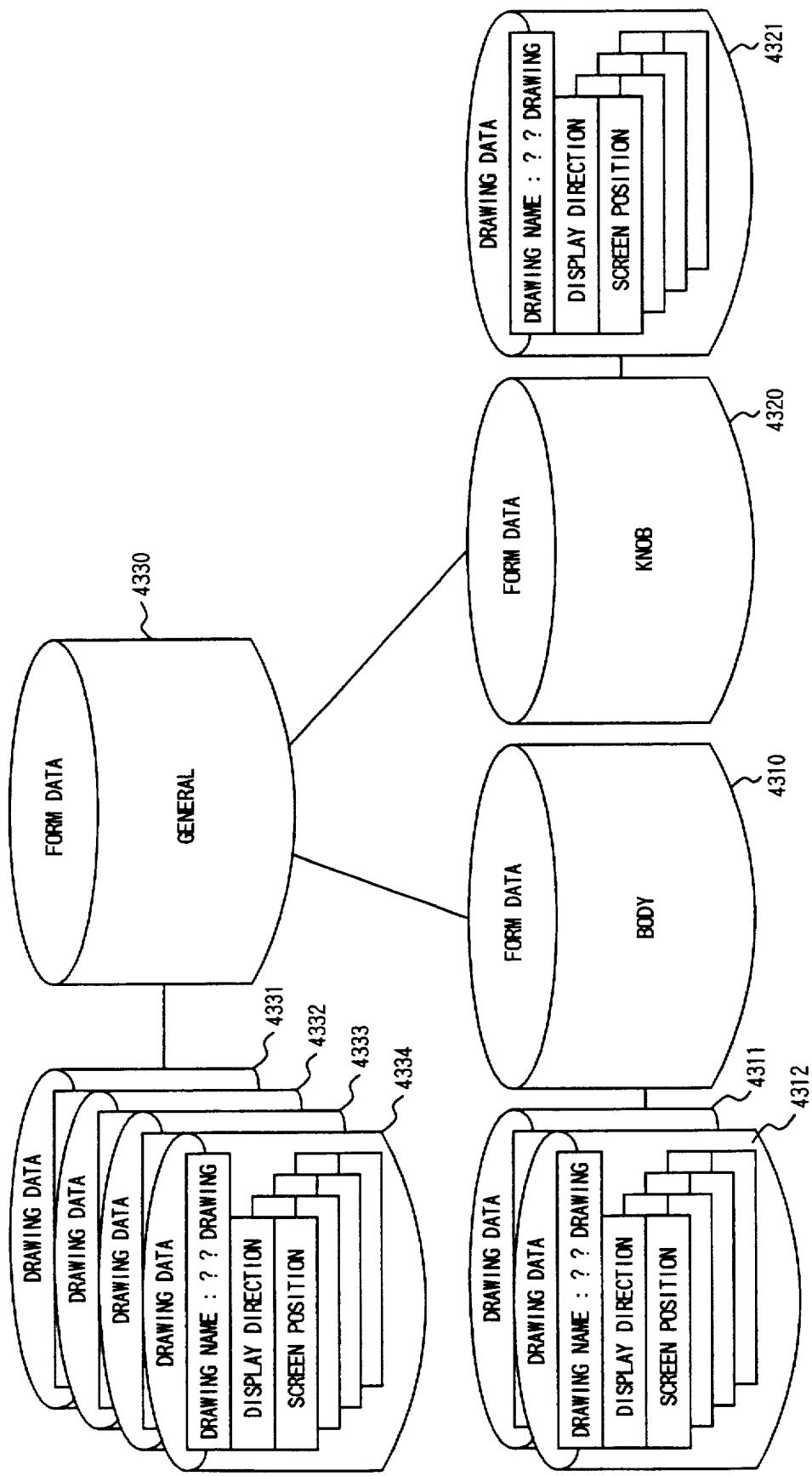
FIG. 23 is a diagram showing another example of the tree structure of saved data.

In displaying any part, whether or not view frames are displayed and whether or not dimensions (lengths etc.) are displayed can be selected with the input device as in the case of the assembly. Especially, the dimensions can be individually designated as to whether or not they are displayed. Accordingly, when various display states are designated and drawing names corresponding thereto are given in the same manner as in the foregoing case of the assembly, data items in a tree structure as shown in FIG. 23 are saved. That is, two types of drawing data for displaying the part "body" are further saved as drawing data files 4311 and 4312 in the memory module 4000 in association with the form data file 4310 of the part "body".

Figure 24:
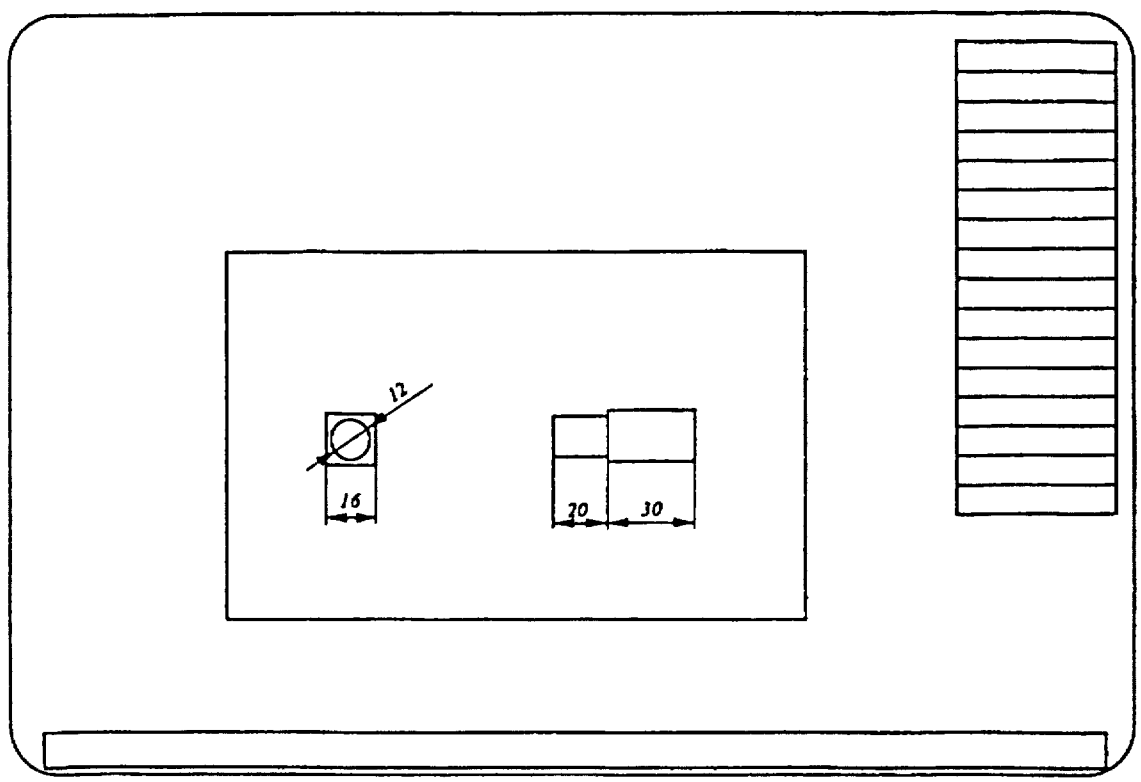
FIG. 24 exemplifies the operating frame of the CAD system.

Regarding the other part "knob", another contrivance is necessary. The reason therefor is that, when the above algorithm is relied on, the "knob" is displayed by the use of the same display data as that of the part "body". The part "knob" is obliquely arranged in the assembled state of the object to-be-designed, but appropriately it should be displayed straight when derived alone. In this embodiment, when a command for bringing a display method into the standard aspect is picked from within the command menu 110 by the use of the input device, the current display method is altered to the configuration of a front view (view 91), a plan view (view 92), a right side view (view 93) and a perspective view (view 94). Moreover, the part "knob" is simple and does not actually require all such views. Therefore, device is prepared for deleting a view or views or for further adding a left side view capable of representing features. Owing to such operations, a drawing as shown in FIG. 24 can be displayed. Also, a drawing with dimensions (lengths) omitted from the drawing of FIG. 24 can be displayed by a similar expedient. When one of such drawings is saved together with a designated drawing name, data items are finally saved as illustrated in FIG. 23. That is, one type of drawing data for displaying the part "knob" is further saved as a drawing data file 4321 in the memory module 4000 in association with the form data file 4320 of the part "knob".

In the state in which the data items shown in FIG. 23 have been saved, the necessary drawing of any required assembly or part can be immediately referred to merely by designating the name of the assembly or part indicative of the object to-be-designed and the drawing name indicative of the display method. As the drawing names, it is preferable to utilize intended uses as they are, in such a manner as an operation drawing, a part machining drawing, an assembly drawing, a mounting dimension drawing and an explanatory drawing for a customer. The present invention, however, is not restricted to the method of determining the drawing names. It is also within the scope of the present invention to employ drawing Nos. for management instead of the drawing names or conjointly with them.

Now, the details of data items to be saved will be described in conjunction with FIGS. 25–30. FIG. 25 shows a portion for managing form data. This portion registers data items saved for parts and assemblies, and the details thereof. Here, even the assembly is dealt with as a kind of part. The contents of the data items are "id" Nos. for identifying the parts, the names of the parts, the names of files storing therein the detailed form data of the parts (the data items of points, lines, surfaces, dimensions such as lengths, etc.), and so forth. The "part id" Nos. are affixed for facilitating the distinction of the parts by the CPU 2100 of the arithmetic module 2000, and the same No. is not used a plurality of times.

FIG. 26 shows an example of data registering the parental relations of parts. This example is such that the "id" Nos. of parent parts and corresponding child parts are respectively arrayed, and it corresponds to the links between the form data items shown in FIG. 23. In general, one assembly is made up of a plurality of parts. One part might be used in a plurality of assemblies. In this table, accordingly, the same Nos. might exist in both the column of the parent pan "id" Nos. and that of the child part "id" Nos.

FIG. 27 shows an example of the data of the detailed forms of individual parts. In this embodiment, the forms are constituted by points, lines, surfaces and dimensions (lengths, etc.). The form constituents of the points, etc., are saved in files which are separate for the respective parts. Accordingly, the "body" identified as the part "id1", for example, has its form expressed by a set which consists of a file "point 1" shown in FIG. 27 and also a file "line 1", a file "surface 1" and a file "dimension 1". This set corresponds to one set of form data in FIG. 23. The names of these files are obtained by joining the types of the form constituents and the part "id" No. There are various methods of expressing forms. Although this embodiment employs the expression method stated above, the present invention is not restricted thereto.

Figure 29:
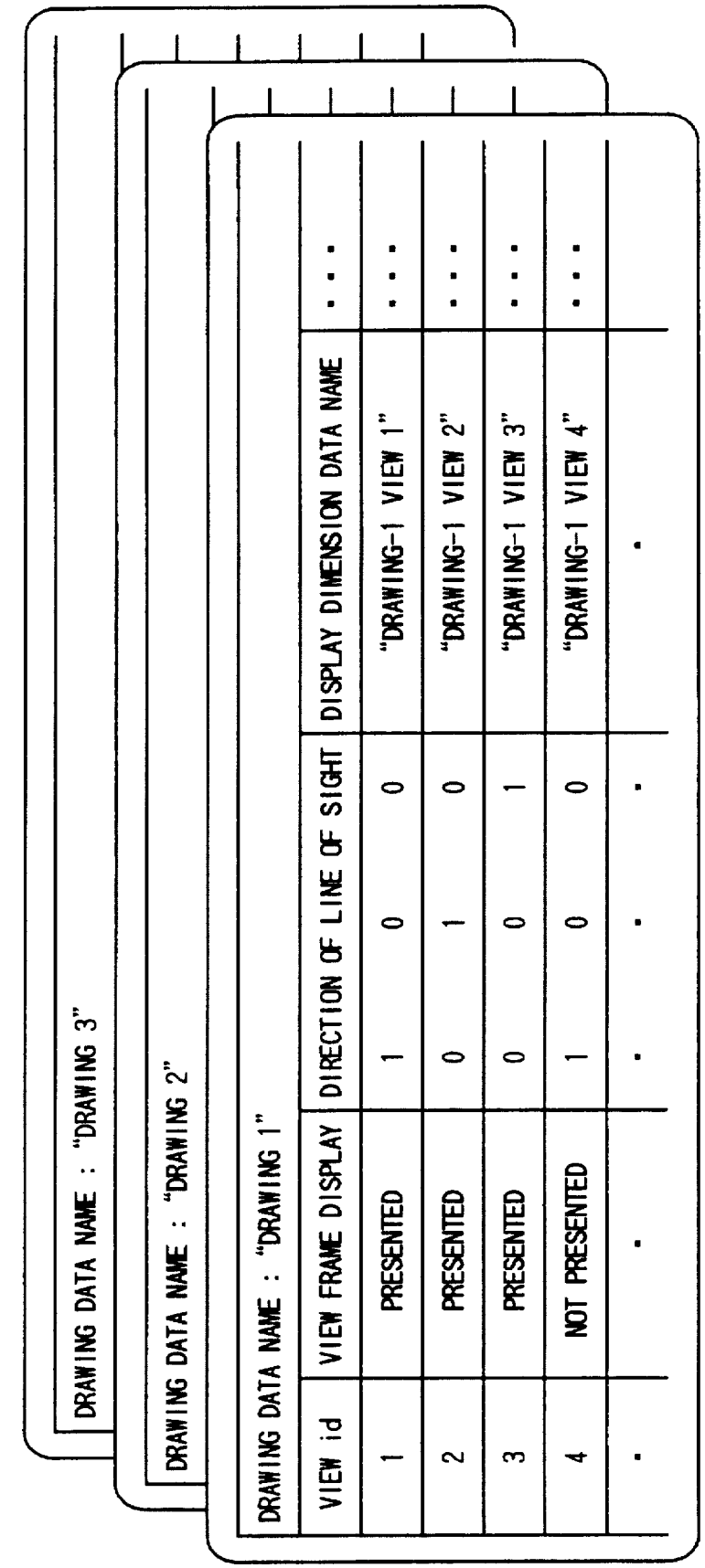
Figure 30:
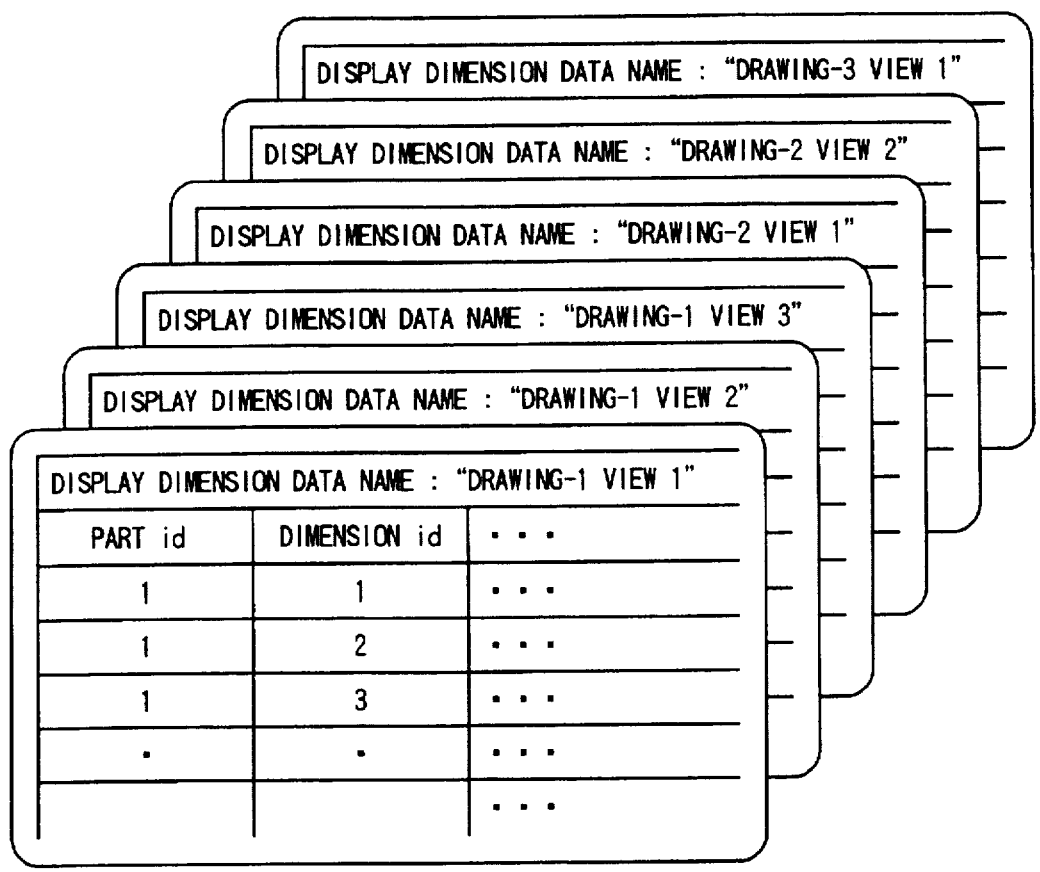

The data items of display methods, in other words, the drawing data items are saved as illustrated in FIGS. 28 thru 30. All drawings stored are managed by data shown in FIG. 28. More specifically, drawing 'id' Nos. are affixed to the respective drawings, and drawing names are given thereto. The drawing 'id' Nos. and the drawing names are associated with the parts. The detailed data items of the individual drawings are saved in separate files. The names of the files are also registered in the table of FIG. 28.

In a data organization shown in FIG. 29, the information items of views depicted in the respective drawings are saved. Within each drawing, unique 'id' Nos. are affixed to the respective views.

FIG. 30 shows an example of the data of dimensions (lengths, etc.) indicated in the individual views. Even when the dimensions are contained in the form data, whether or not they are displayed differs depending upon the purposes of the drawings. Therefore, the data organization of FIG. 30 registers which dimensions are indicated as the data of the views in the data of the drawings.

Now, algorithms for saving such data will be described.

Figure 31:
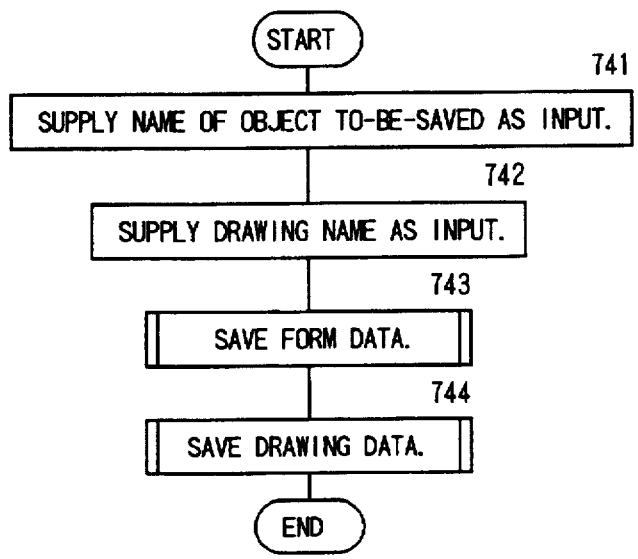

The central processing is a process in which inputting the name of an object to-be-saved (step 741), inputting a drawing name (step 742), saving form data (step 743) and saving drawing data (step 744) are successively carried out as shown in FIG. 31.

Figure 32:
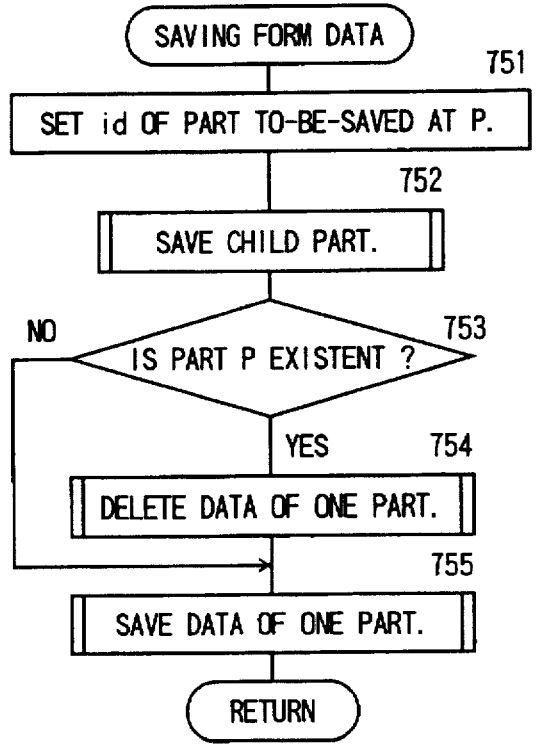

The processing step 743 of saving the form data is as illustrated in FIG. 32. First, on the basis of the 'id' No. of a designated part (or assembly) to-be-saved, the child part(s) of the designated part (or assembly) is saved (steps 751, 752). Subsequently, whether or not a part having the same name or identifier already exists is decided (step 753). If the part of the same name exists, the existing data is deleted (step 754) in order to replace this part with the designated part. Lastly, the part to-be-saved except the child part(s) is saved (step 755).

Figure 33:
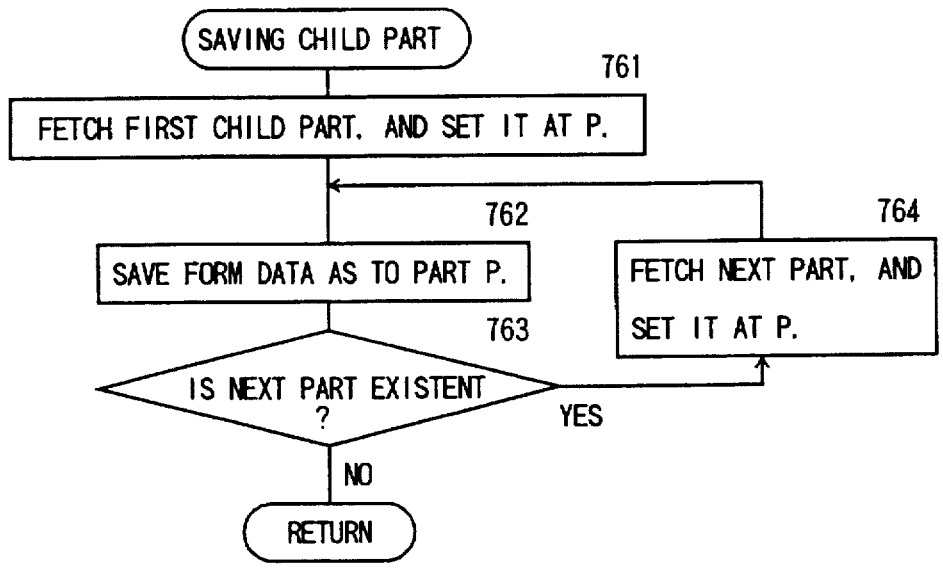

At the step 752 of saving the child part(s), form data items are recursively saved for all the child parts as illustrated in FIG. 33. More specifically, the first child part is fetched and is set at P (step 761). The form data is saved for the part P (step 762). Whether or not the next part existents, is decided (step 763). If the next part exists, it is fetched and is set at P (step 764), and it is subjected to the processing of the step 762. Such a loop recurs until no next part is found to exist (step 763).

Owing to the recursive processing, however deep the hierarchy or tree of parts may be, even the branch and leaf parts can be saved. In this embodiment, all the parts are saved each time in order to simplify the processing. An alternative method is one in which only parts originated anew and parts altered after the retrievals are saved. The present invention is not especially restricted to a specific saving method.

Figure 34:
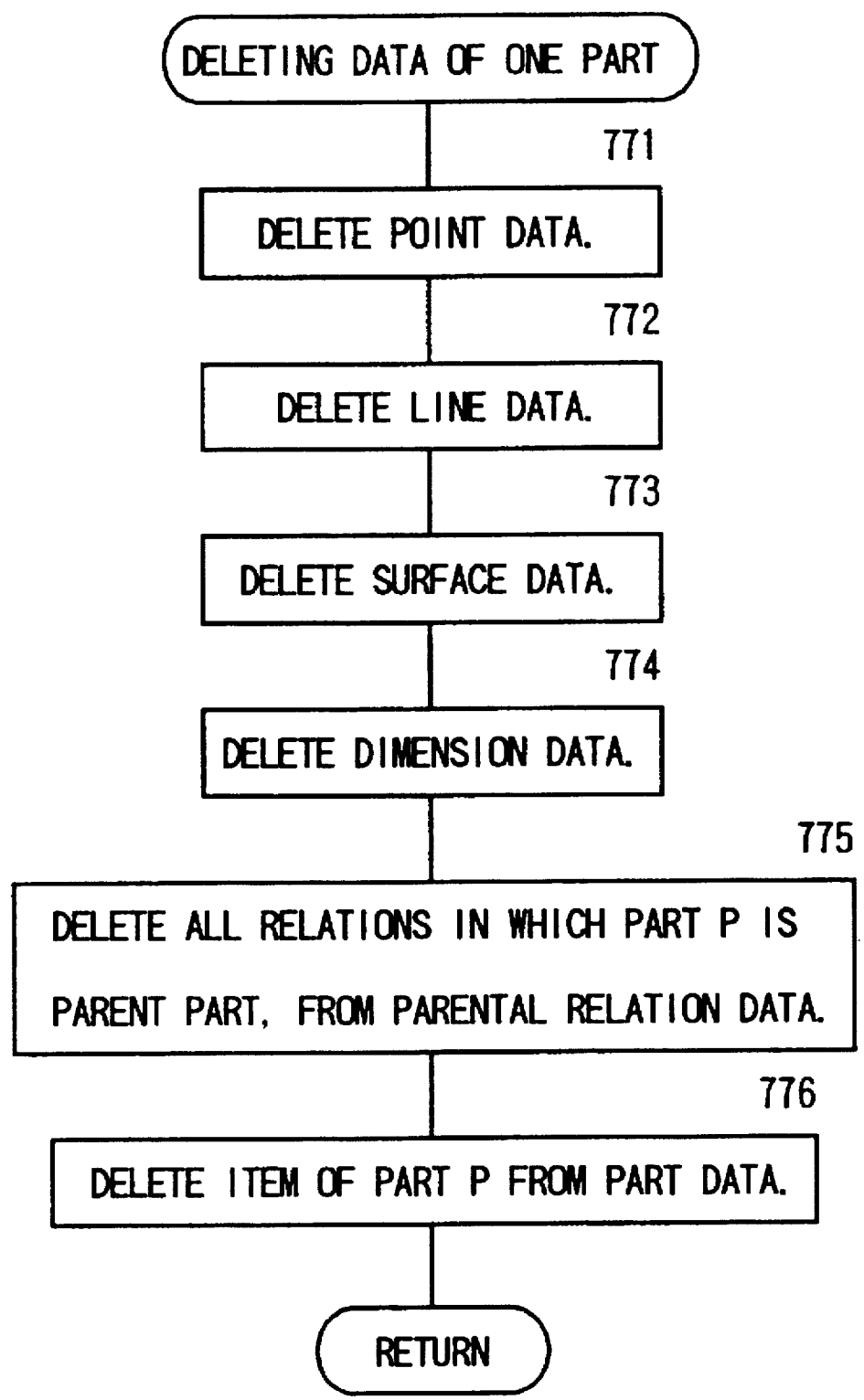

The processing step 754 of deleting one part except the child part(s) is as illustrated in FIG. 34. Point, line, surface and dimension data items are deleted (steps 771–774). Parental relations in which the pertinent part is a parent part are removed (step 775), and the pertinent part is removed from the part data (step 776).

Figure 35:
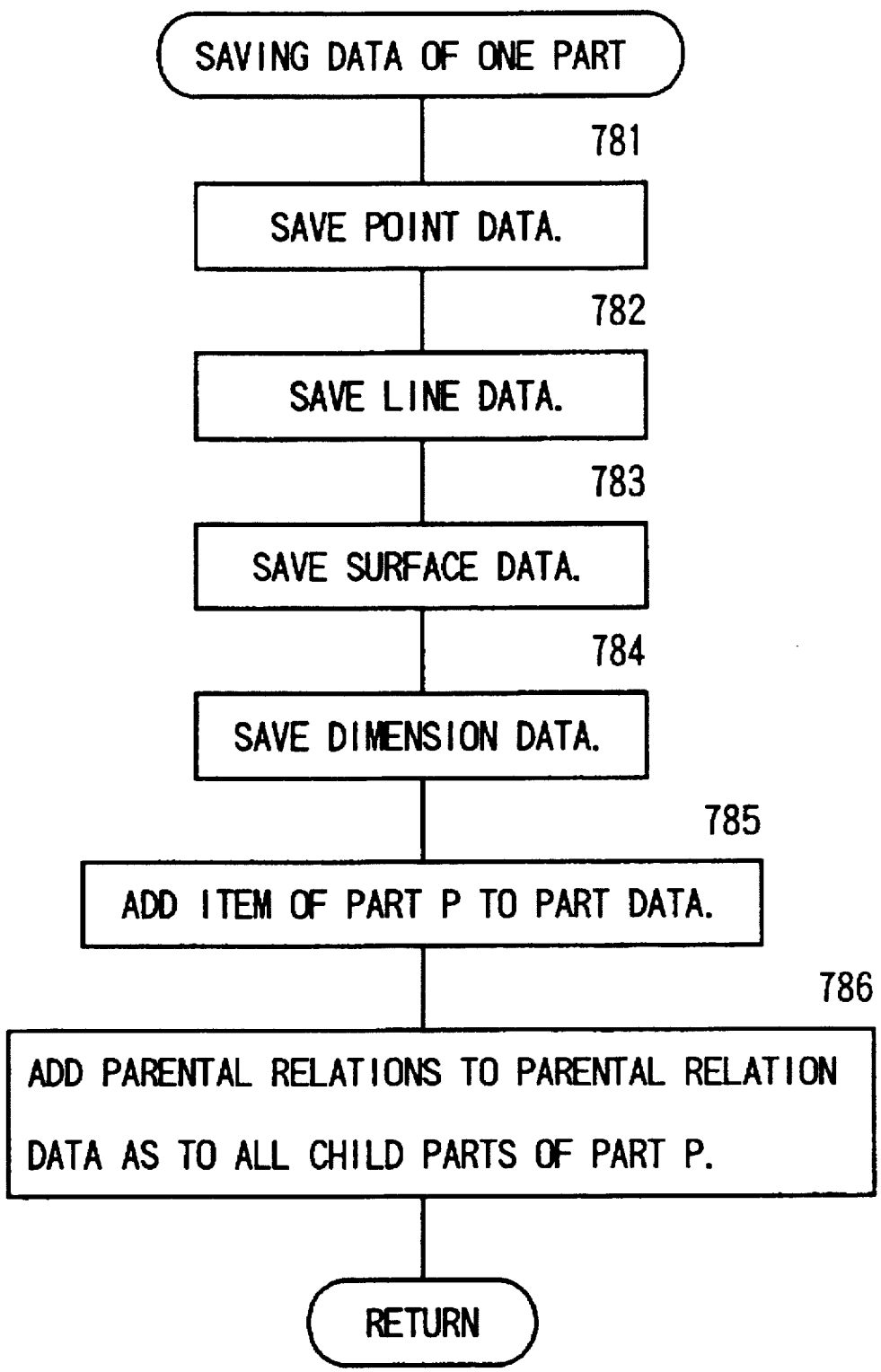

In addition, the processing step 755 of saving one part except the child part(s) is as illustrated in FIG. 35. Point, line, surface and dimension data items are saved (steps 781–784). The pertinent part is added to the part data (step 785), and the parental relations between the pertinent part and its child parts are registered (step 786).

Figure 36:
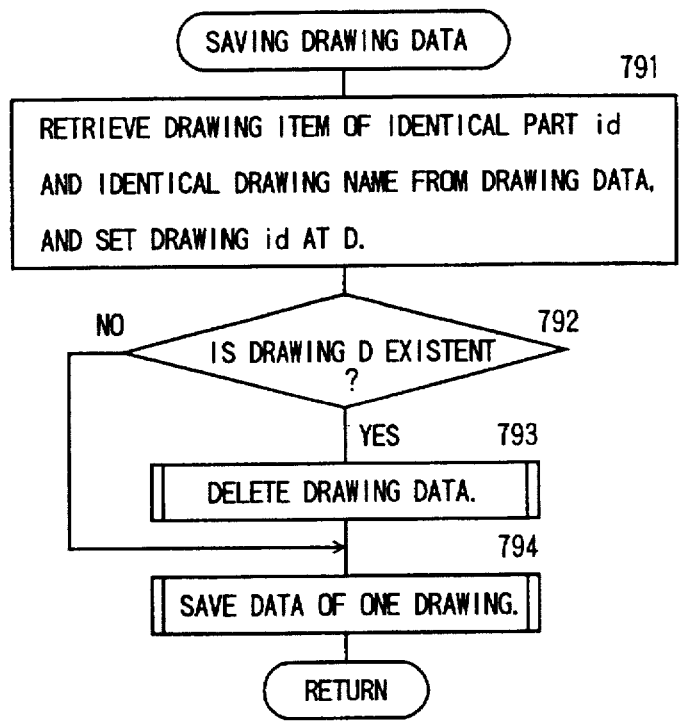

Meanwhile, the processing step 744 of saving the drawing data proceeds as illustrated in FIG. 36. First, the drawing data of the same name or identifier associated with the part to-be-saved is retrieved (step 791). If the drawing data exists, it is deleted in advance (steps 792, 793). Subsequently, the data of one drawing is saved (step 794).

Figure 37:
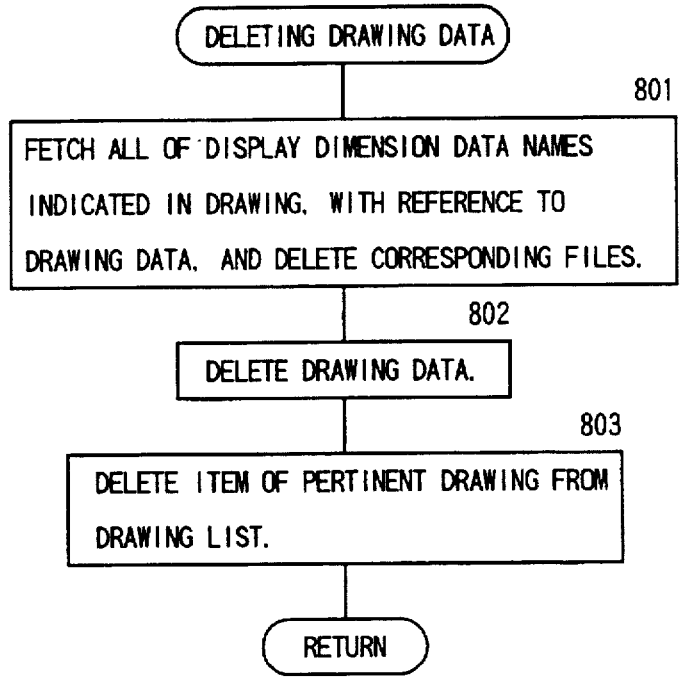

The processing step 793 of deleting the drawing data is as illustrated in FIG. 37. First, the data items of display dimensions (lengths, etc.) saved in association with views contained in the drawing to-be-deleted are deleted (step 801). Subsequently, the drawing data items themselves are deleted (step 802). Lastly, the item of the pertinent drawing is deleted from the drawing list (step 803).

Figure 38:
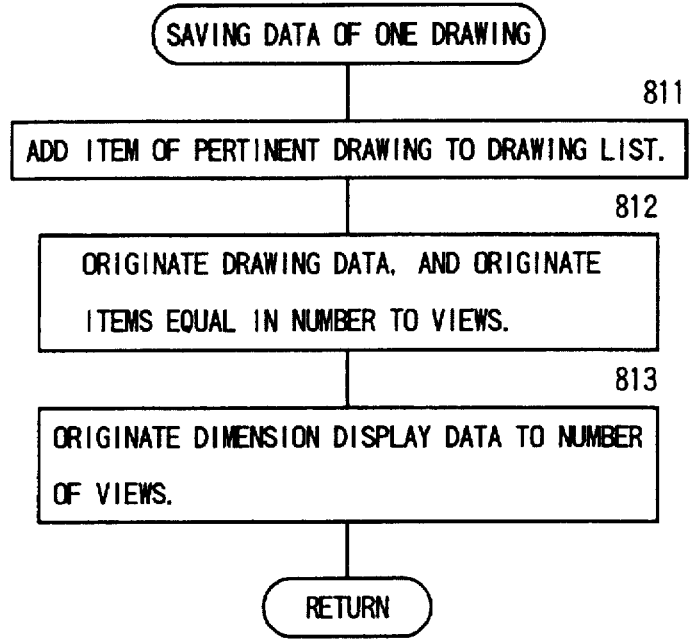

The processing step 794 of saving the data of one drawing is as illustrated in FIG. 38. The item of the pertinent drawing is added to the drawing list (step 811). The drawing data is originated, and items equal in number to the views contained in the pertinent drawing are originated so as to register view information items therein (step 812). Lastly, data items indicative of dimensions (lengths, etc.) contained in the respective views are saved as dimension display data (step 813).

There will now be described algorithms for displaying necessary data by a required method with reference to the data saved as stated above.

Figure 39:
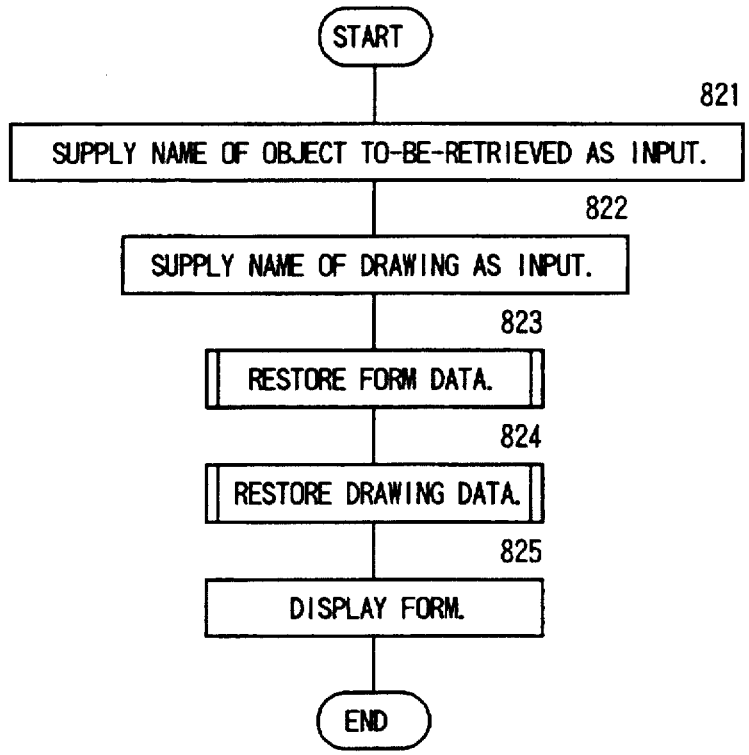

The data is retrieved as illustrated in FIG. 39. First, the processing of inputting the name of an object to-be-retrieved and the name of a drawing is performed by the use of the input device (steps 821, 822). Subsequently, the form data is restored (step 823), and the drawing data is restored (step 824). Here, the restoration of the form data is effected in such a way that the corresponding file stored in the memory module 4000 is transferred to the main memory 2200 by the data saving device. Lastly, the form of the pertinent object is displayed (step 825). In displaying the form, the form data and the display method data have already been restored in the main memory 2200. Therefore, when the restored data items are conformed to, the form and display method data items can be displayed by exactly the same processing as in the first origination processing.

Figure 40:
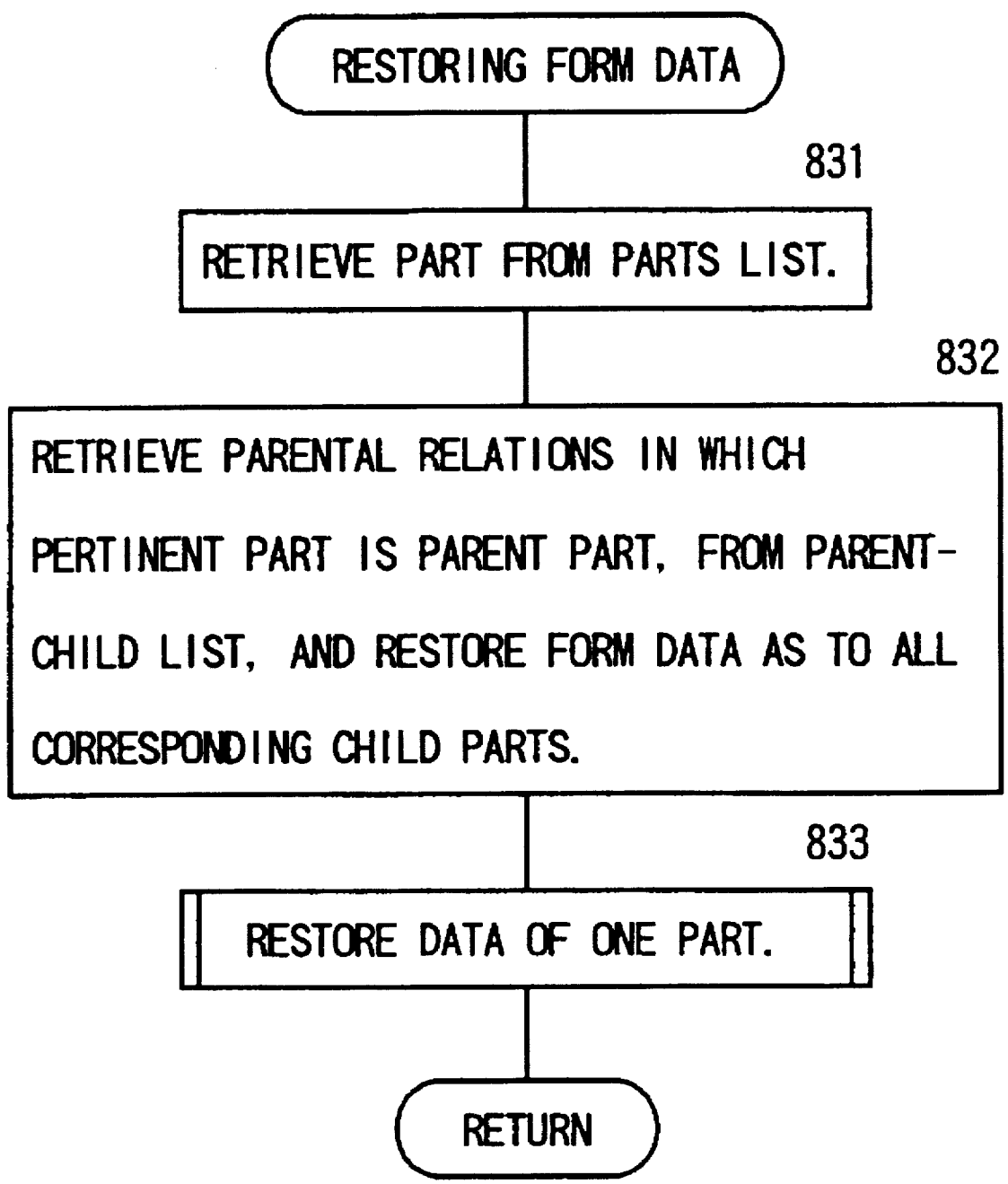

The processing step 823 of restoring the form data proceeds as illustrated in FIG. 40. First, any part of the object to-be-retrieved is retrieved from the parts list (step 831). Subsequently, parental relations in which the pertinent part is a parent part are retrieved, and form data items are recursively restored for all corresponding child parts (step 832). Owing to the recursive processing, even when the hierarchy or tree of the parts is deep, the branch and leaf parts can be restored by the above processing. Lastly, the data of the pertinent part itself is restored (the restoration of the data of one part at a step 833).

Figure 41:
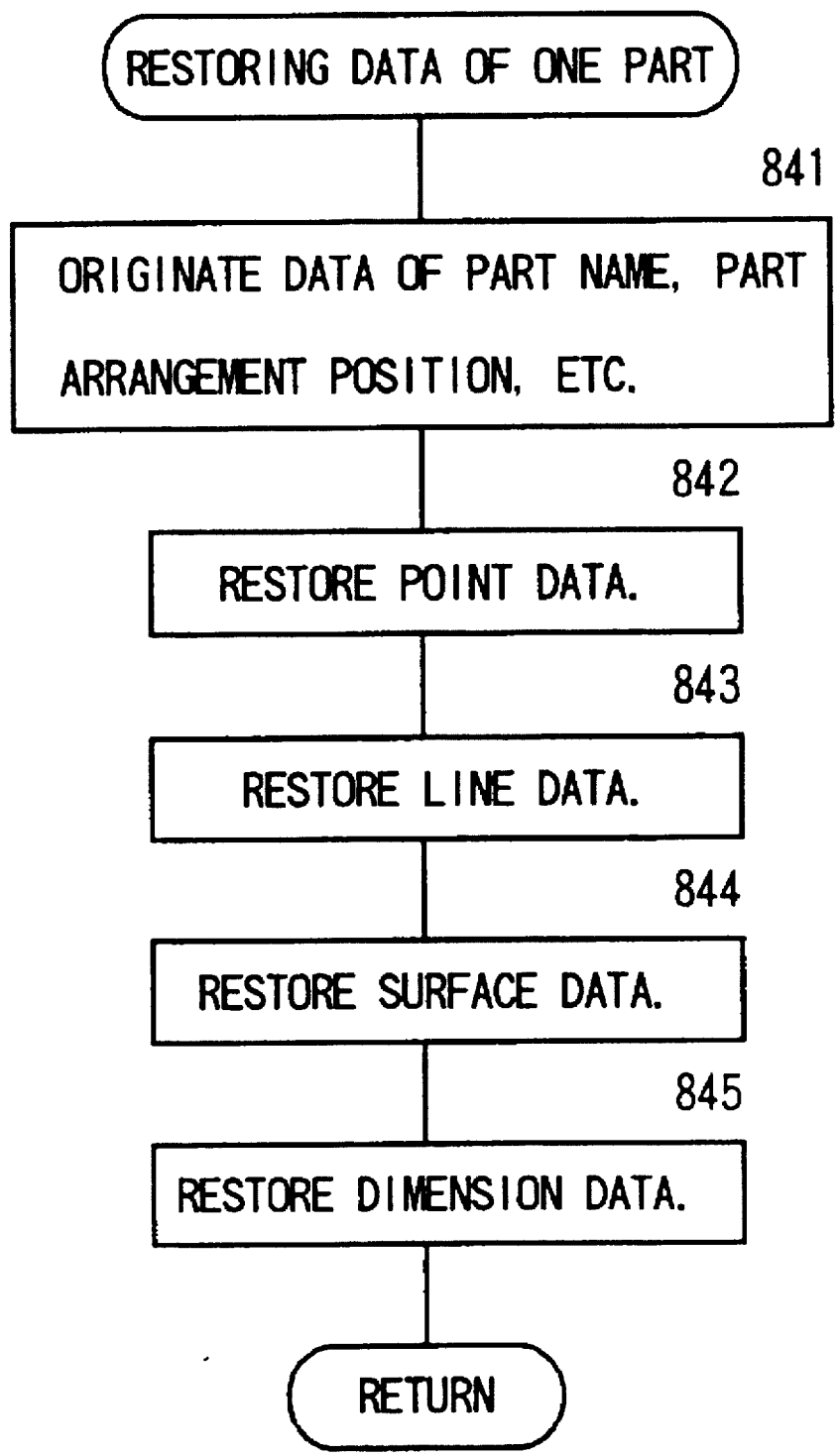

The processing step 833 of restoring the data of one part is as illustrated in FIG. 41. First, the display device prepares the locations of the part in the main memory 2200, and the part name, part arrangement position, etc. of the part are registered in the locations (step 841). Subsequently, the point, line, surface and dimension data items of the part are successively restored, and the locations of the data items are reserved in the main memory 2200 so as to register these data items (steps 842–845).

Figure 42:
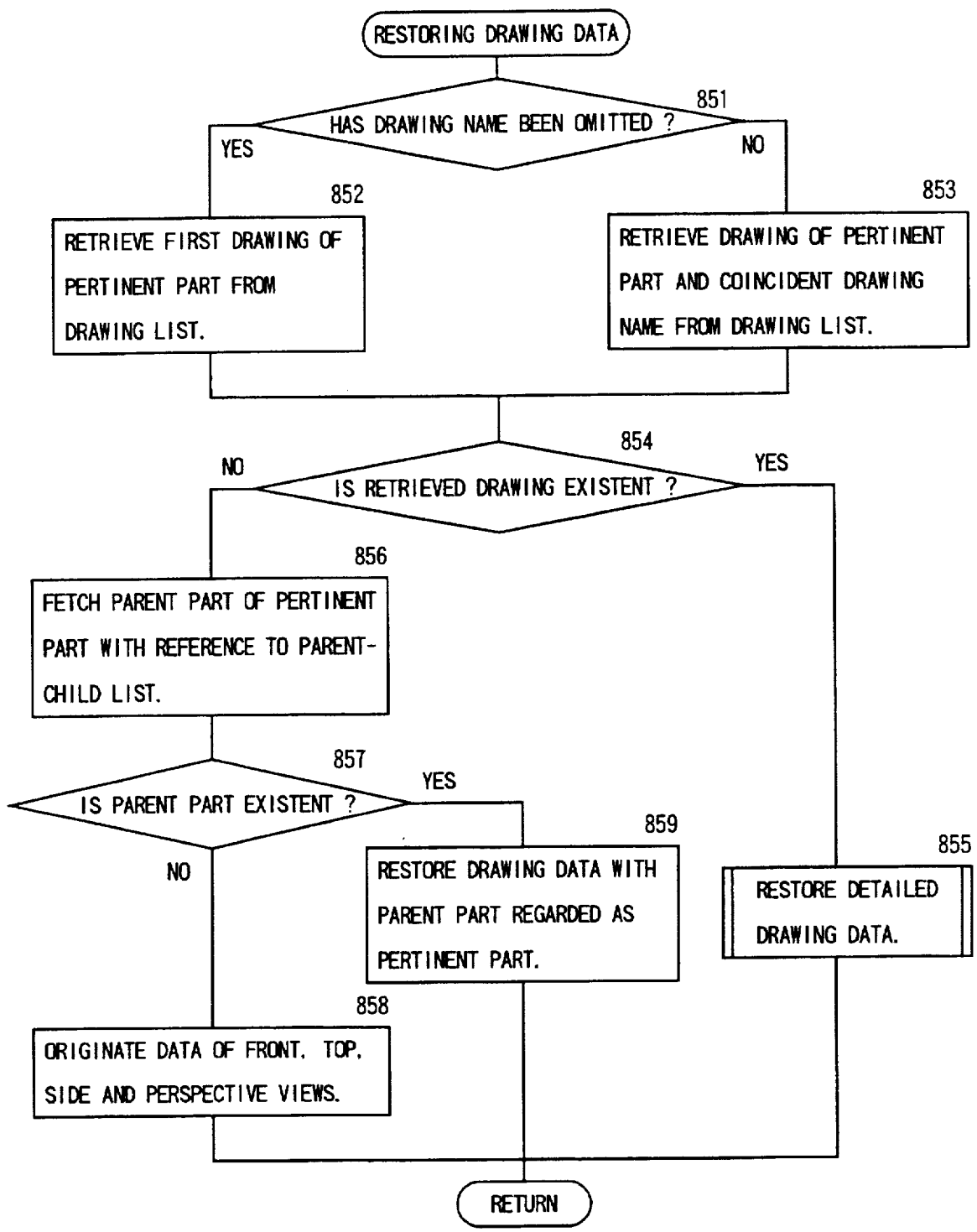

The processing step 824 of restoring the drawing data proceeds as illustrated in FIG. 42. The display device first decides whether the drawing name has been input from the input device or has been omitted (step 851). When the drawing name has been omitted, the first drawing is retrieved, and when it has been input, a drawing of coincident drawing name is retrieved (steps 852, 853). Subsequently, the display device checks whether or not the pertinent drawing has been found (step 854). If the pertinent drawing has been found, that is, if it exists, the detailed data of the drawing is restored (step 855). Otherwise, similar retrievals are done while the parent of the pertinent part, the parent of the first-mentioned parent, etc. are being traced with reference to the list indicating the parental relations (step 856). Further, whether or not the parent part of the pertinent part exists is decided (step 857). In a case where the pertinent drawing has not been found in spite of arrival at the most ancestral parent, the data items of front, top, side and perspective views are originated so as to display the pertinent part by the standard method (step 858). In a case where the parent part exists, it is regarded as the pertinent part, and the drawing data thereof is restored (step 859).

The processing step 855 of restoring the detailed drawing data is as illustrated in FIG. 43. The display device first originates the views in accordance with the view data contained in the drawing data (step 861). Subsequently, the display device restores the display dimension data in the main memory 2200 in order to know the dimension data items which are to be indicated in the respective views. Further, the display device specifies the dimension data which are to be used for the display, in accordance with the user's designation from the input device (step 862).

When a drawing is saved and displayed by the method stated above, the alteration of the drawing based on a form alteration becomes very easy. There will now be explained circumstances in the case where a plurality of drawings concerning one form are originated and where the form is thereafter altered. Let's consider an example in which the length of the part "knob" is reduced.

It is assumed that the data items of the "general" structure of the assembly stated before, i.e., the data items shown in FIGS. 25–30 have already been saved. It is also assumed that the data items have already been sent from a design engineer to a fabrication engineer for the purpose of the fabrication. There are a person who actually fabricates the part, a person who assembles the part, et al. around the fabrication engineer. It is therefore assumed that all relevant people have already referred to the data items at this point in time.

Here, it is assumed that a design alteration has become necessary. First, when one part "knob" is retrieved, it is displayed in the state shown in FIG. 24. By way of example, a form alteration command is used for the alteration. The form alteration command is not peculiar to the present invention, but it is the same as in many conventional CAD systems. As a result, the coordinate values of four points are altered as internal data. How the internal data change, depends upon the method of expressing form data. Since, in this embodiment, the forms of a line and a surface depend upon the positions of points, the positions and forms of the line and surface are changed merely by altering the positions of the points.

In this state, the part "knob" is saved under the same drawing name as in the retrieval operation. Then, data items which differ only in the coordinate values of the points altered before are saved. Since only the form data of the "knob" is altered, the drawing data does not change at all even if it relates to the part "knob". In retrieval operations after the alteration, all drawings are displayed in altered states because the same form data is referred to in all the retrievals of the part "knob", the "general" assembly, etc. That is, once the form is altered, all the drawings containing the form have the form changed. Therefore, the drawings containing the part "knob" need not be individually altered.

Figure 44:
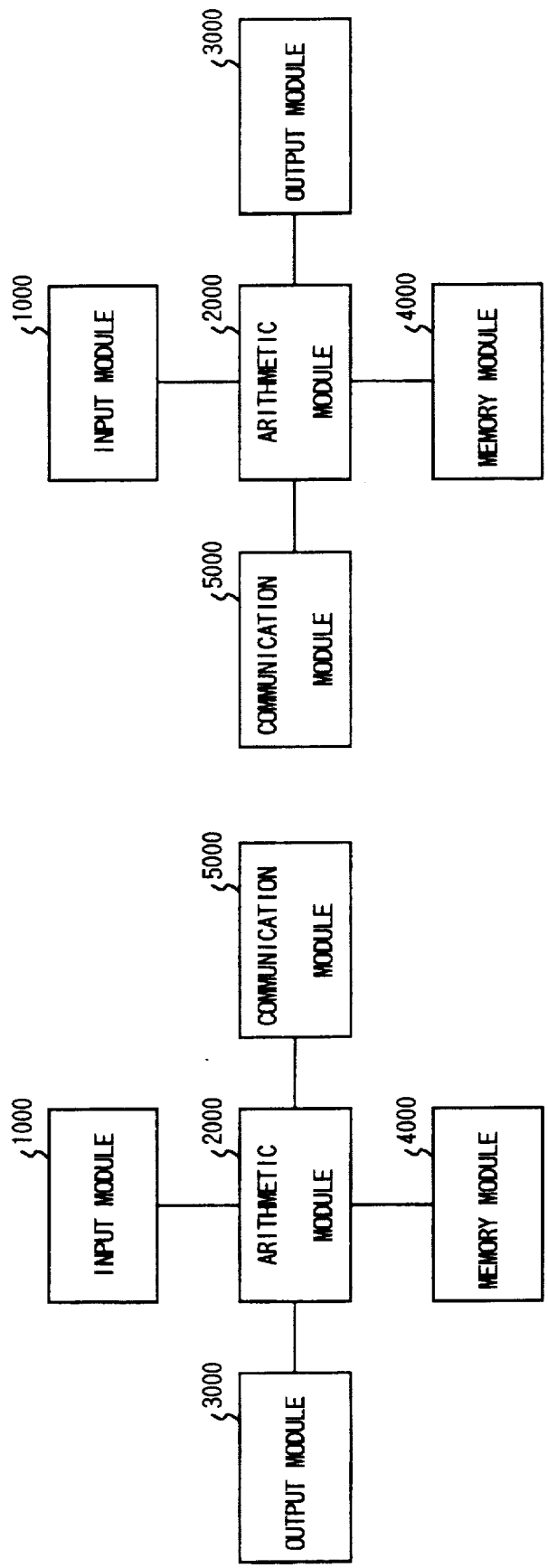
FIG. 44 is a diagram showing the architecture of a CAD system in another embodiment of the present invention.

The third embodiment for realizing the present invention is applied to a computer-aided design/production plant which comprises a plurality of computer-aided design (CAD) systems as described in the first or second embodiment, and communication device for connecting the CAD systems. More specifically, as illustrated in FIG. 44, the plant of the third embodiment is constructed comprising two CAD systems each of which includes an input module 1000, an arithmetic module 2000, an output module 3000 and a memory module 4000, and communication modules 5000 which serve to connect both the CAD systems. The input module 1000, arithmetic module 2000, output module 3000 and memory module 4000 are constructed similarly to those of the system of FIG. 5 already described, and substantially the same software as used in the first or second embodiment is installed in each CAD system.

Figure 45:
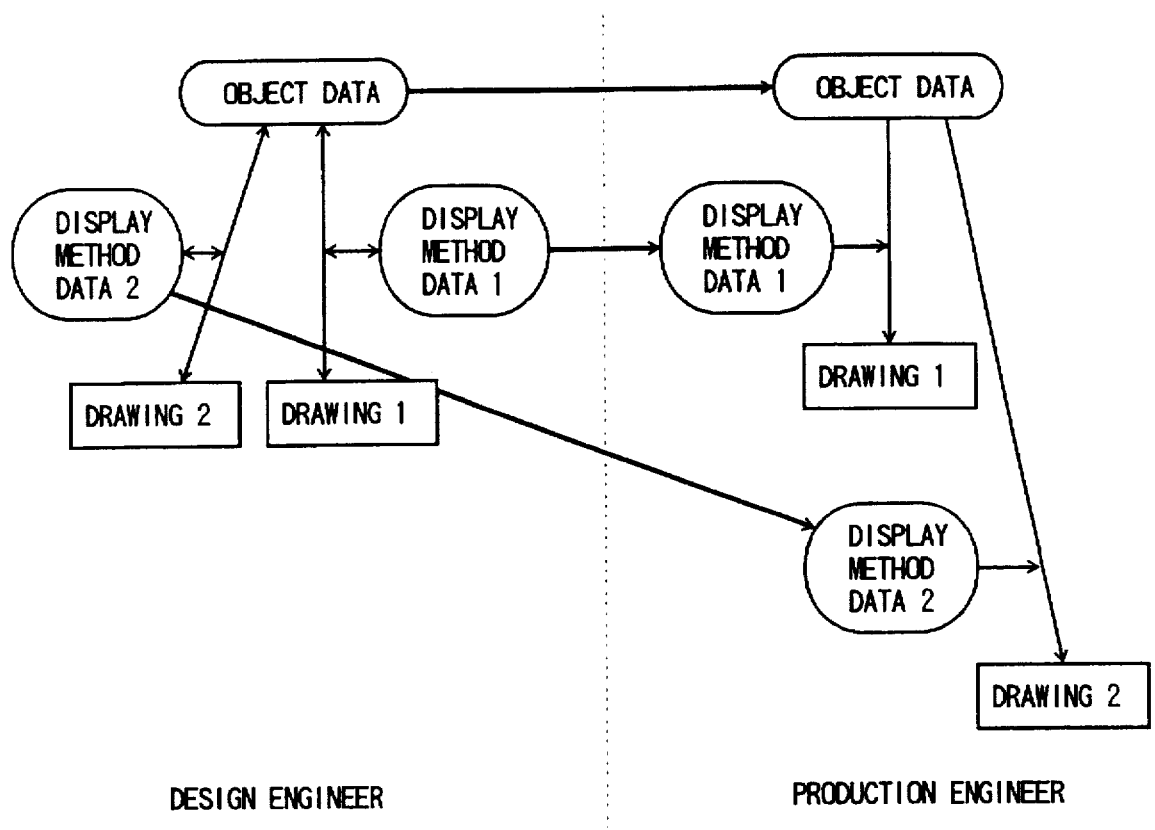
FIGS. 45 and 46 are diagrams each showing an example of data exchange.

In the computer-aided design/production plant, the transfer of drawing information (design information) from a design department to a production department can be schematically depicted as illustrated in FIG. 45. More specifically, one set of data of an object to-be-designed and a plurality of sets of data of display methods are delivered from a design engineer to a production engineer. Accordingly, the production engineer can obtain the design information which is displayed in the same favorable state as a display state having been referred to by the design engineer, merely by designating the display method data. This is based on the fact that the plurality of types of display method data have been delivered in spite of the data of the object to-be-designed being in only one set. The example shown in FIG. 45 corresponds to a case where the data items of the display methods are of two types. The present invention, however, is not restricted to the two types in relation to the display methods.

Now, methods of utilizing this embodiment will be described in more detail.

The design engineer plans a product to be fabricated, and determines the specifications thereof. Subsequently, the structure of the product is studied to ensure that it satisfies the specifications. The computer-aided design system (CAD system) is utilized to study the structure. Further, it is possible to save information under the study and information on studied results as data items of the CAD system. The data items contain form data, dimension data, data on a fabrication method, etc. On this occasion, the design engineer designates the display methods of the data in order to facilitate inputting the data of a form and dimensions (lengths, etc.). This makes possible such operations that a front view and a right side view are arrayed and displayed on a single screen, that only a specified part is displayed, and that the dimension data is prevented from being displayed, even if it exists. The designation of the display methods by the design engineer is intended to facilitate understanding of the data under study. When the design has been studied, it is usually designated to display the product by a method with which the full portrait of the studied results is readily grasped. In general, however, the amount of studied contents are enormous and are difficult to display with only one display frame. In this embodiment, therefore, the design engineer designates a plurality of sets of display methods and prints the images of the frames of the respective display method sets on sheets of paper by way of example, to thereby express and grasp the whole aspect of the studied results. The information items thus obtained are delivered to the production engineer, who begins to produce the product. In this embodiment, the plurality of sets of data of the display methods which are used on this occasion are registered.

With the system of this embodiment, when the design is complete, one set of data of the object to-be-designed and the plurality of sets of data of the display methods corresponding to the object data can be transferred. Accordingly, one set of object data and the plurality of sets of display method data corresponding to the object data are delivered from the design engineer to the production engineer. The transfer of the data items can be effected through, for example, the communication module 5000. Alternatively, it can be effected through floppy disks or the like.

The production engineer obtains the information items of the studied results of the design originated by the design engineer, and first tries to understand them. Since the information items to be delivered are complicated, understanding is difficult unless appropriate displays are presented. According to the present invention, the data items of the plurality of display methods have been delivered. Therefore, the appropriate displays are automatically presented without defining display methods anew, by employing the display method data. When the production engineer has understood the contents, they actually produce the product by utilizing certain display information for the machining of a part and certain display information for the assembling of parts by way of example.

In some cases, the design and the production do not proceed favorably as stated above. Examples of the cases are a case where the design engineer has noted a mistake in the design after the delivery of the information to the production engineer, and a case where the production engineer has found a portion which cannot be machined or fabricated. In such a case, the design engineer needs to alter the design and to redeliver altered information to the production engineer again. With this embodiment, in such a case, the design engineer alters the data of the object to-be-designed. Then, only the data of the altered part, subassembly or assembly is delivered to the production engineer. Thus, the production engineer can refer to the altered portion by utilizing the data of the display methods delivered first, in accordance with the notice of the design alteration given separately. Accordingly, the design alteration can be promptly coped with. In a case where the display methods themselves should preferably be altered on account of a large number of design alterations, the display method data items are also altered and redelivered. In this manner, when the present invention is utilized, the information can be exchanged merely by delivering the data of only the altered portions. Since the same data items are prevented from being copied and existing in large numbers, the problem of having to alter many data items does not arise.

Also, the design/production plant can be so constructed that the master data items of the design information are saved on the side of the design engineer, and that the production engineer fetches the master data items through the communication module 5000 so as to utilize them as production drawings. In this case, even when design alteration has occurred, it is only necessary to alter the master data and to notify the production engineer of the occurrence of the design alteration. Further, the plant can be so constructed that master data items are saved on the side of the production engineer, and that the design engineer stores design alteration data in the master data items through the communication module 5000 and notifies the production engineer of the occurrence of the design alteration.

Figure 47:
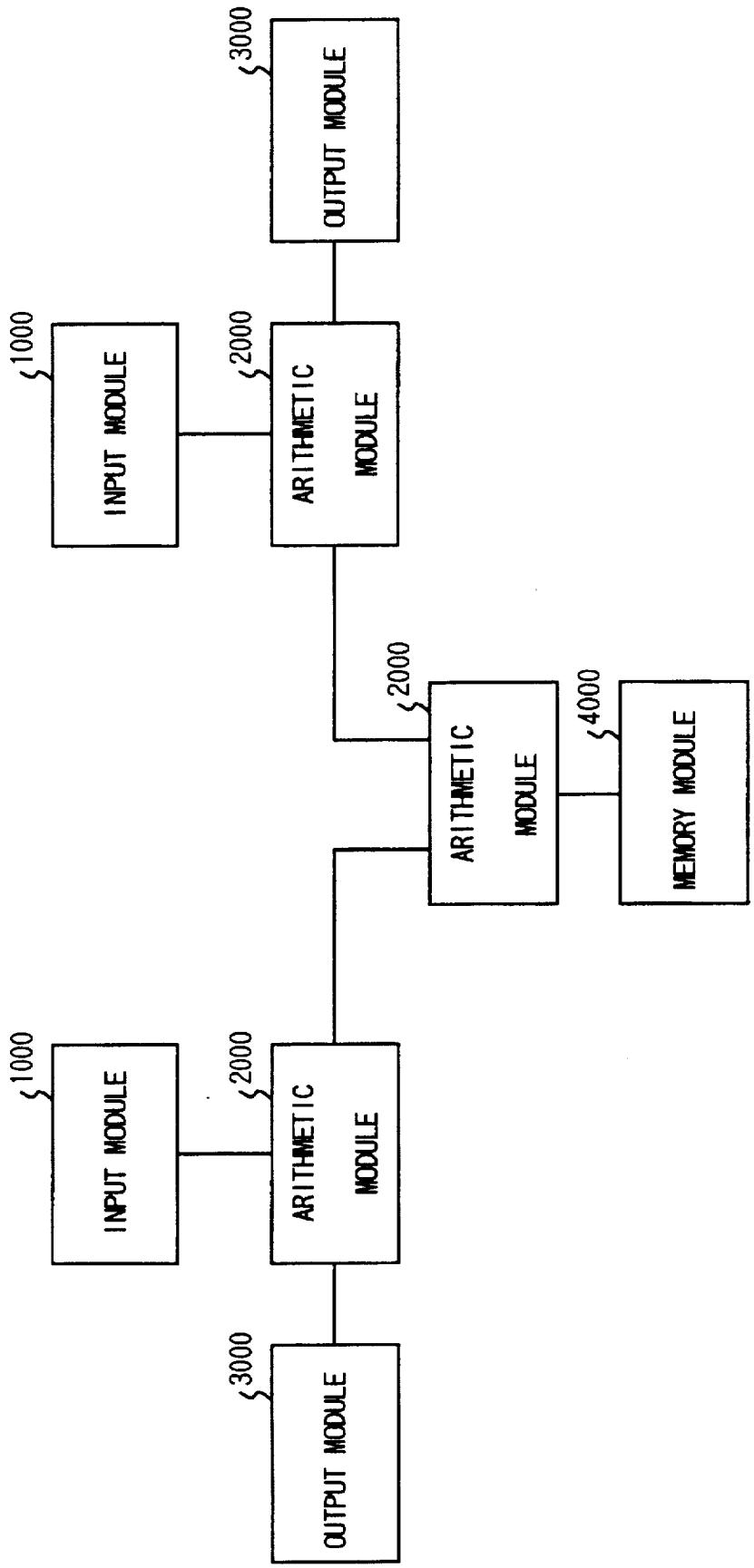
FIG. 47 is a diagram showing the architecture of a CAD system in still another embodiment of the present invention.

The fourth embodiment of the present invention consists in a computer-aided design/production plant comprising a plurality of CAD (computer-aided design) systems each of which has the display methods of the present invention, communication device for connecting the systems, and a memory module which is commonly accessible from the plurality of CAD systems. Herein, as illustrated in FIG. 47, the plant is configured of two CAD systems each of which includes an input module 1000, an arithmetic module 2000 and an output module 3000, and a memory module 4000 which is accessible from the two arithmetic modules. The present invention, however, is not restricted to this configuration. By way of example, it is also possible to adopt a configuration in which the memory module 4000 of one of the two CAD systems connected by communication modules 5000 is utilized in common, or a configuration in which the third CAD system including, at least, an arithmetic module 2000 and a memory module 4000 is separately disposed.

Figure 46:
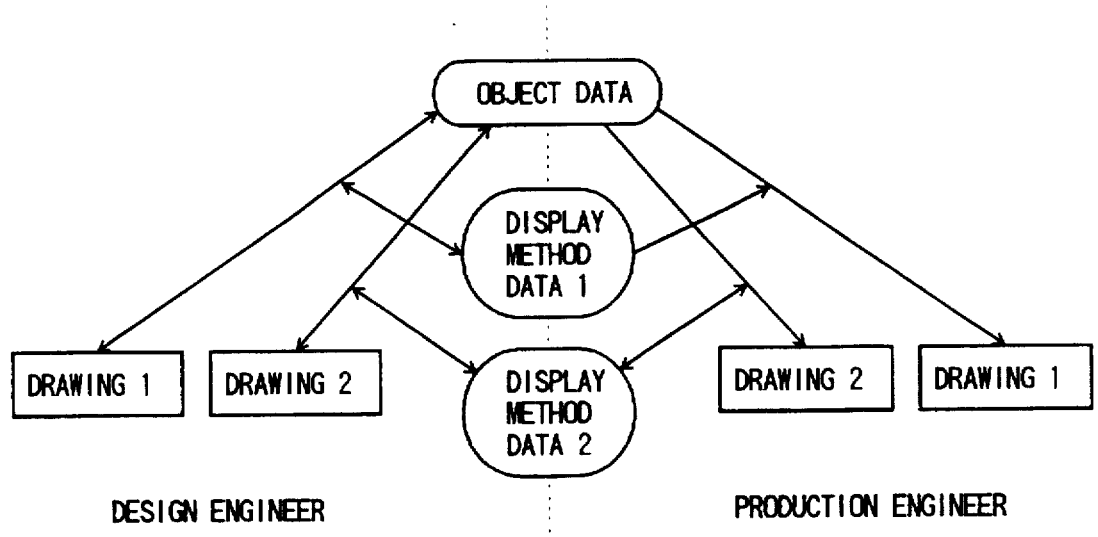

A method of design/production utilizing such a plant can be performed as schematically illustrated in FIG. 46. More specifically, a design engineer and a production engineer use a database held in the memory module 4000 which is commonly accessible. With this method, the design engineer saves the data of the information of an object to-be-designed and a plurality of sets of data of the display methods corresponding to the object data, in the database, while the production engineer refers to the saved data. Herein, if necessary, the production engineer can alter the saved data. The jobs of the design engineer and the production engineer are similar to those in the first embodiment. The only difference is the method of transferring information. According to this method, the information transfer in the case of any design alteration becomes more rapid.

Although the above embodiments concern the design information containing the drawing information, the present invention is not restricted to the exemplified information. The invention is extensively applicable to the processing of information containing drawings.

According to the present invention, a plurality of types of display method can be saved for one object in advance. Therefore, a drawing in a required display aspect can be displayed merely by selecting any of the display methods, and the standard display of the object to-be-displayed can be presented by simple instructions.

Moreover, according to the present invention, a drawing can be displayed by a plurality of types of display method without copying drawing information. As a result, when design alteration occurs, the alteration of one type of drawing suffices, and the labor of the drawing alteration attendant upon the design alteration is relieved considerably.

What is claimed is:

1. A drawing information processing method wherein drawing information of objects to-be-displayed are saved, and wherein a selected object to-be-displayed whose information is included in said drawing information is displayed on a display screen, said method comprising the steps of:

saving a plurality of sets of display method data, each set of display method data for stipulating a display state in which a user assembled drawing of an object to-be-displayed is to be displayed, said each set of display method data being stored in corresponding relation with one set of display object data;

selecting at least one set of said plurality of sets of display method data saved, in order to select a desired display

21 method of presenting the display of the object to-be-displayed; and displaying said object to-be-displayed in accordance with the selected display method data;

wherein said display method data is data which designates a method of generating an image for said object to-be-displayed.

2. A drawing information processing method wherein drawing information of objects to-be-displayed are saved, and wherein a selected object to-be-displayed whose information is included in said drawing information is displayed on a display screen, said method comprising the steps of:

saving a plurality of sets of display method data, each set of display method data for stipulating a display state in which a user assembled drawing of an object to-be-displayed is to be displayed, said each set of display method data being stored in corresponding relation with one set of display object data;

selecting at least one set of said plurality of sets of display method data saved, in order to select a desired display method of presenting the display of the object to-be-displayed; and displaying said object to-be-displayed in accordance with the selected display method data;

wherein said display method data contains display object data which specifies said object to-be-displayed, display direction data which designates an attitude of display of said object to-be-displayed, and screen position data which specifies a position of said object to-be-displayed on said display screen.

3. A drawing information processing method wherein drawing information of objects to-be-displayed are saved, and wherein a selected object to-be-displayed whose information is included in said drawing information is displayed on a display screen, said method comprising the steps of:

saving a plurality of sets of display method data, each set of display method data for stipulating a display state in which a user assembled drawing of an object to-be-displayed is to be displayed, said each set of display method data being stored in corresponding relation with one set of display object data;

selecting at least one set of said plurality of sets of display method data saved, in order to select a desired display method of presenting the display of the object to-be-displayed; and displaying said object to-be-displayed in accordance with the selected display method data;

wherein said display method data is saved for every frame on said display screen.

4. A drawing information processing method as defined in claim 3, wherein when a single frame has a plurality of views, said display method data is saved for every view contained in said frame.

5. A drawing information processing method as defined in claim 4, wherein said display method data which is saved for every view contains display object data which specifies said object to-be-displayed, display direction data which designates an attitude of display of said object to-be-displayed, and screen position data which specifies a position of said object to-be-displayed on said display screen.

6. A drawing information processing method wherein drawing information of objects to-be-displayed are saved, and wherein a selected object to-be-displayed whose information is included in said drawing information is displayed on a display screen, said method comprising the steps of:

22 saving a plurality of sets of display method data, each set of display method data for stipulating a display state in which a user assembled drawing of an object to-be-displayed is to be displayed, said each set of display method data being stored in corresponding relation with one set of display object data;

selecting at least one set of said plurality of sets of display method data saved, in order to select a desired display method of presenting the display of the object to-be-displayed; and displaying said object to-be-displayed in accordance with the selected display method data;

wherein said object to-be-displayed is an assembly which is constructed by assembling parts, and said display object data contains data which specifies a form of each of said parts and said assembly.

7. A drawing information processing method as defined in claim 6, wherein said display method data is saved in correspondence with said assembly.

8. A drawing information processing method as defined in claim 7, wherein said display method data is saved for every type of drawing.

9. A drawing information processing method as defined in claim 8, wherein when a single drawing has a plurality of views, said display method data is saved for every view of said drawing.

10. A drawing information processing system, comprising:

saving means for saving drawing information of objects to-be-displayed, display means for displaying a selected object to-be-displayed on a display screen on the basis of the drawing information, and input means for accepting external instructions and for selecting a desired display method;

said saving means having as said drawing information of said object to-be-displayed, display object data which specify forms of said object to-be-displayed, and a plurality of sets of display method data, each set of display method data stipulating a display state in which a user assembled drawing of an object to-be-displayed is to be displayed, and in which each set of display method data for stipulating the different display states are saved in relation with said display object data;

said input means accepts selection of at least one of said plurality of sets of display method data; and, said display means displays said object to-be-displayed in accordance with selected display method data;

wherein said saving means has as said display method data, display object data which specifies said object to-be-displayed, display direction data which designates an attitude of said display of said object to-be-displayed, and screen position data which specifies a position of said object to-be-displayed on said display screen.

11. A drawing information processing system, comprising:

saving means for saving drawing information of objects to-be-displayed, display means for displaying a selected object to-be-displayed on a display screen on the basis of the drawing information, and input means for accepting external instructions and for selecting a desired display method;

said saving means having as said drawing information of said object to-be-displayed, display object data which specify forms of said object to-be-displayed, and a plurality of sets of display method data, each set of display method data stipulating a display state in which a user assembled drawing of an object to-be-displayed is to be displayed, and in which each set of display method data for stipulating the different display states are saved in relation with said display object data;

said input means accepts selection of at least one of said plurality of sets of display method data; and, said display means displays said object to-be-displayed in accordance with selected display method data;

wherein said saving means includes separate respective files in which said display method data is saved for every frame on said display screen.

12. A drawing information processing system as defined in claim 11, wherein said saving means includes separate respective files in which, when a single frame has a plurality of views, said display method data is saved for every view contained in said frame.

13. A drawing information processing system as defined in claim 12, wherein said display method data which is saved for every view contains display object data which specifies said object to-be-displayed, display direction data which designates an attitude of said display of said object to-be-displayed, and screen position data which specifies a position of said object to-be-displayed on said display screen.

14. A drawing information processing system, comprising:

saving means for saving drawing information of objects to-be-displayed, display means for displaying a selected object to-be-displayed on a display screen on the basis of the drawing information, and input means for accepting external instructions and for selecting a desired display method;

said saving means .having as said drawing information of said object to-be-displayed, display object data which specify forms of said object to-be-displayed, and a plurality of sets of display method data, each set of display method data stipulating a display state in which a user assembled drawing of an object to-be-displayed is to be displayed, and in which each set of display method data for stipulating the different display states are saved in relation with said display object data;

said input means accepts selection of at least one of said plurality of sets of display method data; and, said display means displays said object to-be-displayed in accordance with selected display method data;

wherein said object to-be-displayed is an assembly which is constructed by assembling parts, and said display object data contains data which specifies a form of each of said parts and said assembly.

15. A drawing information processing system, comprising:

saving means for saving drawing information of objects to-be-displayed, display means for displaying a selected object to-be-displayed on a display screen on the basis of the drawing information, and input means for accepting external instructions and for selecting a desired display method;

said saving means having as said drawing information of said object to-be-displayed, display object data which specify forms of said object to-be-displayed, and a plurality of sets of display method data, each set of display method data stipulating, a display state in which a user assembled drawing of an object to-be-displayed is to be displayed, and in which each set of display method data for stipulating the different display states are saved in relation with said display object data;

said input means accepts selection of at least one of said plurality of sets of display method data; and, said display means displays said object to-be-displayed in accordance with selected display method data;

edit means for accepting external instructions and editing data as to said object which is to be displayed by said display means.

16. A drawing information processing system as defined in claim 15, wherein said edit means includes an input module which serves to accept said external instructions, and an arithmetic module which has a function of altering at least one of said display object data and said display method data in accordance with the input instruction afforded from said input module.

17. A drawing information processing system as defined in claim 16, wherein said saving means has a function of saving that data of said display object data and said display method data which has been edited by said edit means.

18. A drawing information processing system as defined in claim 17, wherein said display object data is design data.

19. A drawing information processing system as defined in claim 15, comprising a hardware system which includes an input module, an arithmetic module, a memory module and an output module and in which said arithmetic module runs programs, thereby to realize said saving means, said display means, said input means and said edit means; wherein said display object data is design data.

20. A drawing information processing system as defined in claim 19, further comprising a plurality of such hardware systems which are connected through communication means.

21. A drawing information processing system as defined in claim 15, further comprising:

a first hardware system which includes an input module, an arithmetic module, a memory module and an output module and in which said arithmetic module runs programs, thereby to realize said saving means, said display means, said input means and said edit means;

a second hardware system which includes an input module, an arithmetic module and an output module and in which said arithmetic module runs programs, thereby to realize said display means, said input means and said edit means; and communication modules which are respectively connected to said first and second hardware systems so as to allow communication therebetween;

wherein said display object data is design data.

22. A drawing information processing system as defined in claim 15, further comprising:

a plurality of first hardware systems each of which includes an input module, an arithmetic module and an output module and in which said arithmetic module runs programs, thereby to realize said display means, said input means and said edit means; and a second hardware system which includes an arithmetic module and a memory module and in which said arithmetic module runs a program, thereby to realize said saving means;

said second hardware system being connected to said first hardware systems in common;

wherein said display object data is design data.

23. A drawing information processing system as defined in claim 22, further comprising communication modules which are respectively connected to said hardware systems so as to allow communication thereamong;

wherein said display object data is design data.

24. A method of displaying an object to-be-displayed, which is expressed in a form of a drawing on a display screen, comprising the steps of:

preliminarily storing object data representing forms defining an object to be displayed on the display screen and sets of display method data for stipulating how to display user assembled drawings of said object to-be-displayed, said sets of display method data representing at least two different kinds of predetermined display methods;

selecting at least one data set of said sets of display method data representing at least one desired predetermined display method; and displaying said object to-be-displayed on the display screen, according to a display method contained in a selected said at least one data set and in accordance with said object data;

wherein said object data for representing forms is three-dimensional forms data.

25. A method of displaying an object to-be-displayed, which is expressed in a form of a drawing on a display screen, comprising the steps of:

preliminarily storing object data representing forms defining an object to be displayed on the display screen and sets of display method data for stipulating how to display user assembled drawings of said object to-be-displayed, said sets of display method data representing at least two different kinds of predetermined display methods;

selecting at least one dab set of said sets of display method data representing at least one desired predetermined display method; and displaying said object to-be-displayed on the display screen, according to a display method contained in a selected said at least one data set and in accordance with said object data;

wherein said object data further includes data representing dimensions of said object to-be-displayed.

* * * * *